US012740562B2

(12) United States Patent
Radabaugh et al.

(10) Patent No.: US 12,740,562 B2
(45) Date of Patent: Sep. 22, 2026

(54) HERBICIDE COMPOSITIONS AND METHODS FOR FORMULATING AND USING THE SAME

(71) Applicant: OMS Investments, Inc., Los Angeles, CA (US)

(72) Inventors: Robert Radabaugh, Marysville, OH (US); Harold Thompson, Marysville, OH (US); Jonathon C. Raistlin Newton, Columbus, OH (US); Mark Prinster, Marysville, OH (US); Darrell Michael, Marysville, OH (US)

( * ) Notice: Subject to any disclaimer, the term of this patent is extended or adjusted under 35 U.S.C. 154(b) by 312 days.

(21) Appl. No.: 17/079,457

(22) Filed: Oct. 24, 2020

(65) Prior Publication Data

US 2021/0120821 A1 Apr. 29, 2021

Related U.S. Application Data

(60) Provisional application No. 62/925,535, filed on Oct. 24, 2019.

(51) Int. Cl.

| | |
|---|---|
| ***A01N 43/80*** | (2006.01) |
| ***A01N 37/40*** | (2006.01) |
| ***A01N 43/40*** | (2006.01) |
| ***C05G 3/60*** | (2020.01) |

(52) U.S. Cl.

CPC ............ *A01N 43/80* (2013.01); *A01N 37/40* (2013.01); *A01N 43/40* (2013.01); *C05G 3/60* (2020.02)

(58) Field of Classification Search

CPC ........ A01N 37/40; A01N 43/40; A01N 43/80; C05G 3/60

See application file for complete search history.

(56) References Cited

U.S. PATENT DOCUMENTS

2007/0280981 A1* 12/2007 Birthisel ................ A01N 25/12 424/405
2012/0088670 A1 4/2012 Wells
2013/0274105 A1* 10/2013 Dunne .................. A01N 43/80 504/130

FOREIGN PATENT DOCUMENTS

| | | | |
|---|---|---|---|
| CN | 102027911 | A | 4/2011 |
| CN | 106135233 | A | 11/2016 |
| EP | 1087664 | B1 | 5/2003 |
| JP | 07118086 | A | 5/1995 |
| WO | 2009019432 | A2 | 2/2009 |
| WO | 2016094462 | A1 | 6/2016 |

OTHER PUBLICATIONS

Penn St. https://extension.psu.edu/persistence-of-herbicides-in-soil, no pagination, 1999. (Year: 1999).*
Preen Lawn Step Saver (https://www.preen.com/labels/2163690.pdf, dated at least 2012), 2 pgs no pagination. (Year: 2012).*
UC Davis pesticides and herbicides useful at home (https://wric.ucdavis.edu/PDFs/Weed%20control%20material%20available%20for%20homeowners%202012_TulareKings.pdf, p. 1-3, 2012). (Year: 2012).*
Rummens (Weed Science, vol. 23(1), pp. 4-6 (1975)) (Year: 1975).*
Richer (Pesticide Science, vol. 19, pp. 309-315 (1987)) (Year: 1987).*
International Search Report and Written Opinion of the International Searching Authority for International Patent App. No. PCT/US2020/057244 dated as mailed on Feb. 19, 2021; 14 pages.

* cited by examiner

*Primary Examiner* — Sue X Liu
*Assistant Examiner* — Ali S Saeed
(74) *Attorney, Agent, or Firm* — FBT Gibbons LLP

(57) ABSTRACT

Herbicide compositions for controlling weed plants are disclosed. An herbicide composition can include topramezone and dithiopyr. An herbicide composition can include topramezone, 2,4-D, and dicamba. An herbicide composition can include topramezone, 2,4-D, dicamba, and dithiopyr. Also disclosed are granules coated in an herbicide composition. A method of controlling a weed plant including spreading a plurality of granules coated with an herbicide composition on the weed plant or spraying a liquid herbicide composition on the weed plant.

12 Claims, 4 Drawing Sheets

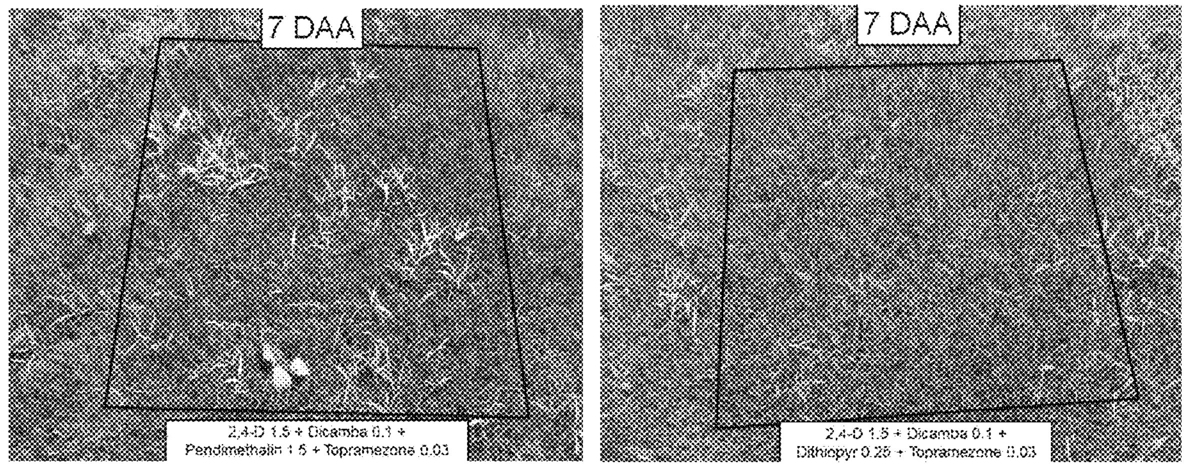
FIG. 1
FIG. 2
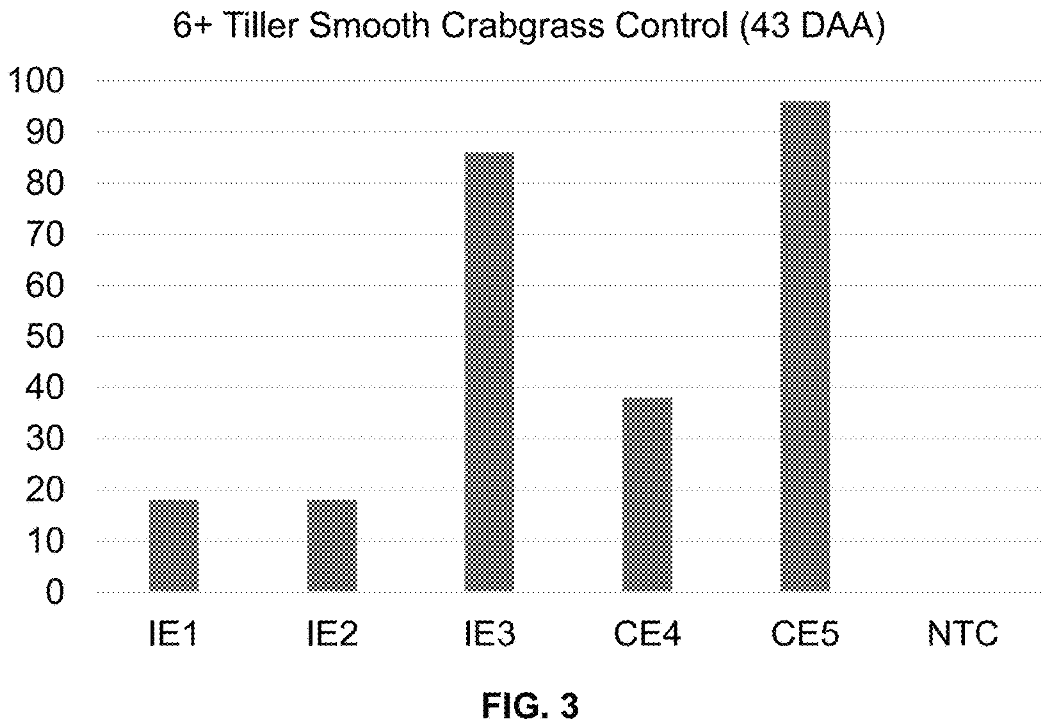
FIG. 3

HERBICIDE COMPOSITIONS AND METHODS FOR FORMULATING AND USING THE SAME

REFERENCE TO RELATED APPLICATIONS

The present application claims the priority of U.S. Provisional Application No. 62/925,535, filed Oct. 24, 2019, and hereby incorporates the same application herein by reference in its entirety.

TECHNICAL FIELD

The present disclosure relates generally to herbicide compositions and methods of making and using the same.

BACKGROUND

Granular weed control products utilized in the consumer lawns industry typically include systemic herbicides such as 2,4-D, MCPP-p, and dicamba for post-emergence foliar application of broadleaf weeds. The active ingredients are generally applied to granular inert carriers or fertilizer granules as a tack-on powder or in a liquid form. Normally, the resulting granular materials are then applied to a wet broadleaf weed plant using a broadcast spreader to spread the granules to the leaf surface. The particles adhere to the moist foliage in order to solubilize the active ingredient, thus allowing it to enter the weed cells and kill the weed plant. It is desirable to provide herbicide compositions with improved herbicidal up-take in weed plants under sub-optimal conditions (e.g., dry) and with more consistent weed control.

SUMMARY

According to one embodiment, an herbicide composition includes topramezone and dithiopyr.

According to one embodiment, an herbicide composition includes topramezone, 2,4-D, and dicamba.

According to one embodiment, an herbicide composition includes topramezone, 2,4-D, dicamba, and dithiopyr.

According to another embodiment, the herbicide composition is granular. A granular herbicide may include granular carrier coated with the herbicide composition. The granular carrier may include fertilizer granules or non-fertilizer granules.

According to another embodiment, the herbicide composition is applied in a liquid form.

According to another embodiment, a method of making a granule includes coating the granule with the herbicide composition described herein.

According to another embodiment, a method of controlling a weed plant includes spreading the granular herbicide on a dry weed plant.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 1 depicts a photograph of turf seven days after application of a comparative composition.

FIG. 2 depicts a photograph of turf seven days after application of a composition according to one embodiment.

FIG. 3 is a chart comparing crabgrass control results from comparative compositions and compositions according to various embodiments.

DETAILED DESCRIPTION

Figure 4:
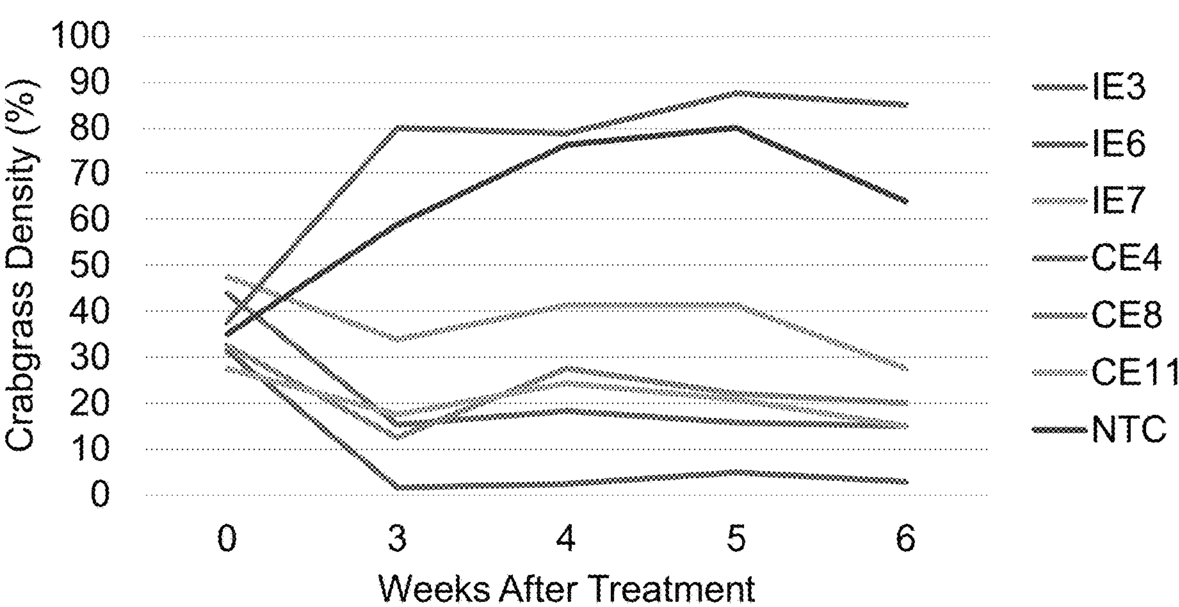
FIG. 4 is a chart comparing crabgrass density over time in areas treated with comparative compositions and compositions according to various embodiments.

Compositions and methods for making herbicide compositions are described herein. The herbicide compositions may be useful for pre-emergent and post-emergent control of weeds. Fertilizer or carrier granules coated with an herbicide composition coating are also described herein. The herbicide compositions are effective even when applied to a plant in sub-optimal situations (e.g., dry foliage conditions). The present compositions and methods reduce the likelihood of consumer application error and improve ease of use versus liquid applied product without sophisticated equipment, while providing similar herbicide effectiveness.

A herbicide composition may include a phenyl pyrazolyl ketone herbicide—topramezone—and an auxin-mimic herbicide, a pyridine herbicide, or a combination thereof. In certain embodiments, the herbicide composition may include topramezone at an application rate in a range of about 0.01 lb. a.i./A to about 0.1 lb. a.i./A, 0.01 lb. a.i./A to about 0.05 lb. a.i./A, or about 0.02 lb. a.i./A to about 0.04 lb. a.i./A. In various embodiments, the herbicide composition may include topramezone at an application rate of about 0.01 lb. a.i./A, about 0.03 lb. a.i./A, about 0.05 lb. a.i./A, or about 0.1 lb. a.i./A. In certain embodiments, the herbicide composition may include topramezone in a range of about 0.005 wt % to about 0.04 wt %, about 0.01 wt % to about 0.035 wt %, about 0.015 wt % to about 0.03 wt %, about 0.02 wt % to about 0.0275 wt %, or about 0.023 wt % to about 0.025 wt %. In some embodiments, the herbicide composition may include topramezone at about 0.02 wt %, 0.024 wt %, or 0.0241 wt %.

In certain embodiments, a herbicide composition may include topramezone and an auxin-mimic herbicide. The auxin-mimic herbicide may include one or more of 2,4-dichlorophenoxyacetic acid (2,4-D); (2R)-2-(4-chloro-2-methylphenoxy)propanoic acid (MCPP-p); 3,6-dichloro-2-methoxybenzoic acid (dicamba); and mixtures thereof, for example. In various embodiments, the herbicide composition may include the auxin-mimic herbicide at an application rate in a range of about 1 pound of active ingredient per acre (lb. a.i./A) to about 2 lb. a.i./A, about 1.5 lb. a.i./A to about 2 lb. a.i./A, or about 1.25 lb. a.i./A to about 1.75 lb. a.i./A. In certain embodiments, the herbicide composition may include the auxin-mimic herbicide at an application rate of about 1.5 lb. a.i./A, about 1.6 lb. a.i./A, or about 1.7 lb. a.i./A. In some embodiments, the herbicide composition may include an auxin-mimic herbicide, which may include an auxin-mimic herbicide mixture, in a range of about 0.05 wt % to about 1.5 wt %, about 0.08 wt % to about 1.3 wt %, about 1 wt % to about 1.3 wt %, about 1.2 wt % to about 1.3 wt %. In certain embodiments, the herbicide composition may include an auxin-mimic herbicide, which may include an auxin-mimic herbicide mixture, about 0.08 wt %, about 1.2 wt %, or about 1.285 wt %. In various embodiments, the herbicide composition may include 2,4-D in a range of about 1 wt % to about 1.5 wt %, about 1.1 wt % to about 1.3 wt %, or about 1.15 wt % to about 1.25 wt %, or at about 1.2 wt % or about 1.205 wt %. In various embodiments, the herbicide composition may include dicamba in a range of about 0.01 wt % to about 0.2 wt %, about 0.05 wt % to about 0.1 wt %, or about 0.07 wt % to about 0.09 wt %, or at about 0.08 wt %. As discussed further in the Examples below, the combination of topramezone with broadleaf herbicides (e.g., 2,4-D) have shown surprising enhanced injury and control of dandelion and clover. The herbicide composition results in increased weed injury symptom development, more complete weed control, and more consistent weed control. Applying the herbicide composition to dry foliage may unexpectedly result in acceptable levels of weed control.

In certain embodiments, the herbicide composition may also include topramezone and a pyridine herbicide, dithiopyr, which is active against pre-emergent weeds. An herbicide composition comprising topramezone and dithiopyr may be used to provide late stage grassy weed control. As discussed further in the Examples below, the combination of dithiopyr and topramezone may act synergistically to provide granular post-emergence weed control. In certain embodiments, the herbicide composition may include dithiopyr at an application rate in a range of about 0.1 lb. a.i./A to about 1 lb. a.i./A, about 0.1 lb. a.i./A to about 0.5 lb. a.i./A, about 0.1 lb. a.i./A to about 0.5 lb. a.i./A, or about 0.2 lb. a.i./A to about 0.5 lb. a.i./A, or about 0.4 lb. a.i./A to about 0.6 lb. a.i./A. In some embodiments, the herbicide composition may include dithiopyr at an application rate of about 0.25 lb. a.i./A, or about 0.5 lb. a.i./A. In various embodiments, the herbicide composition may include dithiopyr in a range of about 0.01 wt % to about 0.5 wt %, about 0.1 wt % to about 0.3 wt %, about 0.15 wt % to about 0.25 wt %, or about 0.18 wt % to about 0.22 wt %, or at 0.20 wt %. In some embodiments, a ratio of dithiopyr to topramezone is in a range of 8:0.9 to 9:1.1 or about 8.3:1.

In certain embodiments, the herbicide composition may comprise 2,4-D, dicamba, dithiopyr, and topramezone. In various embodiments, the herbicide composition may consist essentially of 2,4-D, dicamba, dithiopyr, and topramezone. In certain embodiments, the herbicide composition may consist of 2,4-D, dicamba, dithiopyr, and topramezone. In some embodiments, the herbicide composition may comprise herbicides that consist of 2,4-D, dicamba, dithiopyr, and topramezone. In some embodiments, a ratio of 2,4-D to dicamba to dithiopyr to topramezone is in a range of 48:3:8:0.9 to 52:4:9:1.1 or about 50:3.3:8.3:1.

The herbicide composition may be applied in a liquid form or a granular form. Granular formulations may include the herbicide composition coated on fertilizer granules or granules not including a fertilizer, such as inert granules. Examples of suitable fertilizer granules for use herein are described generally in U.S. Pat. No. 9,663,412, the disclosure of which is incorporated herein in its entirety. In an example, the fertilizer granules may include a mixture of a urea containing fertilizer and rice hulls. Typical carriers for such granular formulations as described in U.S. Pat. No. 5,006,158, the disclosure of which is incorporated herein in its entirety, include sand, fuller's earth, attapulgite clay, bentonite clays, montmorillonite clay, vermiculite, perlite, corn cob, peanut hull, rice hull, and other organic or inorganic materials that absorb or that may be coated with the herbicide composition. A granulated formulation may be made by mixing the herbicidal composition and the granular carrier together and granulating the mixture to form the granulated herbicidal composition. The carrier granules may be sprayed or soaked in the herbicide composition to coat them with the herbicide composition. In an embodiment, the carrier granules may be uniformly coated with the herbicide composition. The example weight percent ranges and values provided above for various components in the herbicide composition may, in various embodiments, be the weight percent ranges and values of those components relative to total weight of a granular herbicide. The granular herbicide may include the granular carrier in a range of, for example, about 90 wt % to about 98.5 wt %.

In certain embodiments, a composition may comprise an herbicide composition, which includes 2,4-D, dicamba, dithiopyr, and topramezone, coated on fertilizer granules. In certain embodiments, the composition may consist essentially of an herbicide composition, which includes 2,4-D, dicamba, dithiopyr, and topramezone, coated on fertilizer granules. In certain embodiments, the composition may consist of an herbicide composition, which includes 2,4-D, dicamba, dithiopyr, and topramezone, coated on fertilizer granules comprising a mixture of a urea containing fertilizer and rice hulls.

In certain embodiments, the herbicide composition includes solvent, a modifier, or surfactant. For example, a viscosity modifier, such as dipropylene glycol (DPG), may be added to the herbicide composition. A viscosity modifier allows for a lower processing temperature, which reduces the possibility of the herbicide decomposing during the mixing process. Additionally, a viscosity modifier may improve active ingredient (a.i.) distribution on the surface of the granule. The herbicide composition may contain from greater than 0% to about 30%, by weight, of a viscosity modifier. In some embodiments, the herbicides may be combined with a solvent (e.g., water, DPG, etc.) before being applied to a granular carrier. When the composition is in a granular form, in some embodiments, the granular herbicide may include a solvent in a range of about 0.5 wt % to about 5 wt %.

In use, the herbicide coated granules are applied to moistened or dry weed leaves, and the herbicide disperses. The synergistic properties of the topramezone and auxin-mimic herbicides (see Example 8 below) help to increase the percentage of active ingredient dispersing from the coated granule even when the weed leaves are dry. The result of higher active ingredient translocation is a greater percentage of weeds kills compared to herbicides formulated without the topramezone when used on dry leaves of broadleaf weeds. Additionally, topramezone and dithiopyr work synergistically to provide granular post-emergence grassy weed control (see Example 7).

The invention can be further understood by reference to examples, of which summaries and detailed descriptions follow. These examples are provided by way of illustration and are not meant to be limiting.

Example 1

Experiments were conducted in Ohio and Oregon to assess the effectiveness of topramezone, an herbicide that inhibits 4-hydroxyphenylpyruvate dioxygenase (HPPD), in combination with other broadleaf herbicides. The experiments were conducted on common dandelion (*Taraxacum officinale*), white clover (*Trifolium repens*), and spotted catsear (*Hypochaeris radicata*). All treatments were applied to wet turf. The new herbicide was compared to a commercially-available granular composition (Comparative Example 1 or CE1) and a commercially-available sprayed composition (Comparative Example 2 or CE2).

The treatments were applied with a shaker jar and a spreader box. Each plot was 3'×3' and was surrounded by 2' buffer strip. The granular treatments applied to wet foliage either by dew or by a hand sprayer. CE2 was applied to dry foliage at 1.5 gal./1000 $ft^2$ spray volume with a single nozzle consumer applicator wand. For the experiments in this example, the application rate of the Inventive Example 1 (IE1) and CE1 are 2.856 lb./1000 $ft^2$, and the application rate for CE2 is 4 pints formulated produce per acre (pt/A).

Table 1 shows the formulations and application rates. IE1 and CE1 are granular products utilizing the same fertilizer base (0.8 lb. N/1000 $ft^2$), which has a N—P—K ratio of 28-0-3. CE2 is a sprayed applied product with no fertilizer base.

TABLE 1

| Example Treatment | Active Ingredient (a.i.) | Application (lb. a.i. / A) |
|---|---|---|
| IE1 | 2,4-D | 1.5 |
| | Dicamba | 0.10 |
| | Topramezone | 0.03 |
| CE1 | 2,4-D | 1.5 |
| | Dicamba | 0.10 |
| CE2 | 2,4-D | 1.0 |
| | MCPP | 0.26 |
| | Dicamba | 0.10 |
| Non-treated control | | — |

The experiment was designed using a randomized complete block design with four replications per treatment. Weed injury and weed control were tested. Weed injury includes discoloration, distortion, and stunting. Data regarding the visual symptoms of weed injury was collected on a 0-10 rating scale (see Table 2 below) to quantify symptom development. Physiological symptoms may include chlorosis (yellowing), necrosis (browning), bleaching (whitening), reddening/purpling, foliar spotting, stunting, epinasty (twisting/malformation), etc.

TABLE 2

| Rating | Weed Injury Description |
|---|---|
| 0 | No evidence of herbicide activity. |
| 1 | Slight or suspected herbicide activity. (e.g., initial flexing of dandelion flower stalks or slight reduction of green color) |
| 2 | Symptoms evident as initial twisting, curling, cupping (epinasty). Weed growth arrested. Noticeable reduction in green color. |
| 3 | Slightly malformed weed growth such that the consumer may not notice it, but the professional turfgrass manager would. Discoloration slight (up to 20% of weed foliage in plot is affected). |
| 4 | Weed growth severely malformed and/or arrested-easily noticed from a distance. Discoloration evident as yellowing, whitening, or reddening of leaves and/or stems (greater than 20% of weed foliage in plot affected). No necrosis yet. |
| 5 | Under close inspection weed necrosis just beginning as leaves and stems begin to brown (up to 10% of weed foliage in plot is brown/necrotic). |
| 6 | Weed necrosis now evident without close inspection (10-20% of weed foliage in plot is brown/necrotic). Easily noticed by a professional. |
| 7 | Weed necrosis readily apparent from a distance and easily noticed by the untrained eye of the consumer (20-50% of weed foliage in plot is brown/necrotic). |
| 8 | Necrosis such that a majority of the tissue is brown / black, but still some green tissue evident (greater than 50% of weed foliage in plot is brown/necrotic). |
| 9 | Complete necrosis of most of the original weed tissue, or initial weed regrowth evident. |
| 10 | Complete necrosis of original weed tissue. No visible weed regrowth. |

Weed control estimates were made by comparing the appearance (e.g., size, vigor, physical condition, density) of individual weed species in treated plots compared to the same species in surrounding untreated buffer area. If the weed density in a plot appears the same as the weed density in the surrounding buffer strip, the "% Weed Control" is recorded as 0%. Differences in treated weeds compared to untreated weeds are assessed based on severity of herbicidal symptoms and progression of herbicidal action at the time of observation. Assessments are recorded as percentages with a maximum of 100% resulting in complete removal of the weeds from a plot. Control data were analyzed using balanced ANOVA to determine if there was a treatment by location interaction. If data sets were statistically similar for a particular rating date, data were pooled and analyzed using one-way ANOVA. If data were statistically different, data were analyzed and reported separately. Treatment means were separated using Fisher's protected Least Significant Difference test (P=0.05).

Treatment Effects on Common Dandelion (Ohio)

The common dandelion trial in Ohio was initiated in spring at a time when plants were at peak bloom. Dandelion Injury (0-10) was evaluated at 7, 14, and 21 days after application (DAA; Table 3).

TABLE 3

| Example Treatment | 7 DAA | 14 DAA | 22 DAA |
|---|---|---|---|
| IE1 | 5.5 a* | 7.5 ab | 10.0 a |
| CE1 | 1.8 cd | 5.0 cd | 8.8 bc |
| CE2 | 4.5 ab | 6.3 bc | 8.8 bc |
| Non-treated Control | 0.0 e | 0.0 e | 0.0 d |
| LSD P = .05 | 1.53 | 1.75 | 0.88 |
| Standard Deviation | 1.04 | 1.19 | 0.6 |
| CV | 35.34 | 24.16 | 7.59 |

*Different letters within a column signify statistical difference

At the 7-day evaluation, the treatment that included topramezone, IE1, caused just as much injury to dandelion as did the liquid-applied CE2. All other granular products had statistically similar levels of herbicide symptomology, all significantly inferior to IE1 and CE2. At the 14 day rating injury symptoms progressed but the statistical breakout was very similar to previous rating, however the topramezone treatment was beginning to show more injury than CE2. At 22 days all dandelions within the topramezone plots were dead showing how this HPPD-inhibiting herbicide can enhance the speed of efficacy when combined with CE1.

Ratings for weed control generally do not begin until 4 weeks into a conventional trial. However, since the topramezone accelerated the loss of weed density, it was determined these ratings were to be taken one week earlier. Table 4 shows the Dandelion control (0-100) evaluated between 3-10 weeks.

TABLE 4

| Example Treatment | 22 DAA | 29 DAA | 44 DAA | 56 DAA | 72 DAA |
|---|---|---|---|---|---|
| IE1 | 100.0 a | 97.8 ab | 94.5 a | 92.0 ab | 90.8 a |
| CE1 | 85.0 c | 85.0 c | 84.8 a | 81.3 b | 73.8 a |
| CE2 | 93.8 b | 99.5 a | 98.0 a | 98.5 a | 98.5 a |
| Non-treated Control | 0.0 d | 0.0 d | 0.0 c | 0.0 e | 0.0 c |
| LSD P = .05 | 5.86 | 10.19 | 17.95 | 12.02 | 25.35 |
| Standard Deviation | 3.98 | 6.93 | 12.21 | 8.18 | 17.24 |
| CV | 4.86 | 8.46 | 16.43 | 12.29 | 27.83 |

At the 3 week rating the treatment with topramezone, IE1, was rated as having 100% dandelion control. CE1 had statistically inferior control at 3 weeks. Beginning at 4 weeks however, resprouting in many of the treatments began to occur, some worse than others. IE1 had plants that resprouted, but control at the final 10 week rating was still considered highly acceptable. Through the trial, CE2 gave the most consistent results. CE1 gave marginally acceptable results early but, by 10 weeks, dandelion control dropped to an unacceptable level thus illustrating the value of adding topramezone. Of the treatments containing 2,4-D, this was the only treatment that did not provide acceptable weed control results at 10 weeks.

Treatment Effects on Spotted Catsear (Oregon)

In the spotted catsear control trial in Oregon, spotted catsear control (0-100) was evaluated at 6-10 weeks after application (see Table 5 below).

TABLE 5

| Example Treatment | 27 DAA | 42 DAA | 56 DAA | 70 DAA |
|---|---|---|---|---|
| IE1 | 41.3 ab | 91.3 a | 70.0 a | 88.8 a |
| CE1 | 53.8 a | 80.0 ab | 71.3 a | 62.5 ab |
| CE2 | 41.3 ab | 58.8 bc | 58.8 ab | 43.8 bc |
| Non-treated Control | 0.0 c | 0.0 e | 0.0 c | 0.0 d |
| LSD P = .05 | 25.11 | 26.6 | 37.39 | 38.04 |
| Standard Deviation | 17.07 | 18.09 | 25.43 | 25.87 |
| CV | 49.45 | 31.77 | 53.64 | 55.18 |

Topramezone gave acceptable results beginning at 6 weeks (and possibly earlier but no data was taken prior to 4 weeks) and was maintained through the 10 week rating. By comparison, CE2 provided no acceptable weed control at any of the ratings.

Treatment Effects on White Clover (Ohio)

The white clover trial in Ohio was initiated at a time when the dandelions were still at peak bloom, the recognized trigger for consumer purchase and application of weed and feed type products in the northern United States. The injury (0-10) of the white clover was evaluated at 3, 10, 13, and 18 days after application (see Table 6 below).

TABLE 6

| Example Treatment | 3 DAA | 10 DAA | 13 DAA | 18 DAA |
|---|---|---|---|---|
| IE1 | 2.0 ab | 5.0 ab | 5.0 ab | 9.0 a |
| CE1 | 1.5 ab | 2.8 cd | 5.5 ab | 7.8 bc |
| CE2 | 2.3 a | 5.5 a | 6.3 a | 8.0 abc |
| Non-treated Control | 0.0 c | 0.3 e | 0.0 d | 0.0 d |
| LSD P = .05 | 1.13 | 1.57 | 2.24 | 1.12 |
| Standard Deviation | 0.77 | 1.07 | 1.53 | 0.76 |
| CV | 48.23 | 32.52 | 35.13 | 12.47 |

IE1 gave better results early (1-2 weeks) looking much like the results provided by CE2. Again, IE1 showed accelerated results compared to the other granular products as was observed with common dandelion (Table 5). However, by 3 weeks, all treatments caused very similar levels of weed injury.

White clover control (0-100) was evaluated in Ohio between 3-8 weeks after application (see Table 7 below).

TABLE 7

| Example Treatment | 18 DAA | 25 DAA | 28 DAA | 41 DAA | 53 DAA |
|---|---|---|---|---|---|
| IE1 | 93.8 a | 98.3 a | 98.8 a | 99.6 a | 96.8 ab |
| CE1 | 86.3 ab | 81.3 c | 88.8 c | 81.4 c | 76.3 b |
| CE2 | 85.0 ab | 98.5 a | 98.8 a | 99.1 a | 98.8 a |
| Non-treated Control | 0.0 c | 0.0 d | 0.0 d | 0.0 d | 12.5 c |
| LSD P = .05 | 10.8 | 7.5 | 5.01 | 4.32-4.44 | 20.73 |
| Standard Deviation | 7.34 | 5.1 | 3.4 | 6.26t | 14.1 |
| CV | 11.31 | 7.42 | 4.81 | 10.76t | 20 |

CE2 provided excellent clover control. However, the granular treatment containing topramezone, IE1, also gave outstanding clover control. CE1 gave marginally acceptable results giving greater than 80% control through 6 weeks.

Treatment Effects on White Clover (Oregon)

White clover control (0-100) was evaluated in Oregon between 4-10 weeks after application (see Table 8 below).

TABLE 8

| Example Treatment | 27 DAA | 42 DAA | 56 DAA | 70 DAA |
|---|---|---|---|---|
| IE1 | 65.0 a | 92.5 a | 86.3 a | 65.0 a |
| CE1 | 65.0 a | 75.0 a | 68.8 ab | 28.8 b |
| CE2 | 60.0 a | 85.0 a | 81.3 a | 61.3 a |
| Non-treated Control | 0.0 c | 0.0 c | 0.0 c | 0.0 b |
| LSD P = .05 | 13.79 | 20.11 | 34.61 | 30.71 |
| Standard Deviation | 9.38 | 13.68 | 23.54 | 20.89 |
| CV | 18.19 | 20.12 | 38.73 | 67.85 |

The results from this trial were drastically different than those found in Ohio. The consistency of control provided by the combination that included topramezone in the Ohio trial was not observed at this this location. The treatments gave very brief high-levels control. At no time did CE1 provide acceptable clover control. CE2 spray provided acceptable control at 6 and 7 weeks only.

Conclusions

In most cases, topramezone provided accelerated injury and greater control of target weeds when compared to herbicide combinations without.

Including topramezone to 2,4-D+dicamba accelerated the speed of activity on common dandelion and white clover in Ohio. The addition of topramezone tended to enhance the overall herbicidal efficacy when compared to the combination without it. This herbicide combination was the only treatment that gave acceptable spotted catsear control in Oregon. Topramezone combined with 2,4-D+dicamba (IE1) provided results with a granular formula much more similar to that of the sprayed standard CE2 and was an improvement over the granular standard CE1.

Example 2

Experiments were conducted to explore the capabilities of herbicide compositions including the active ingredient topramezone where pre-emergent herbicide and post-emergent broadleaf herbicides were combined with a post-emergent crabgrass component. The experiments were conducted on common dandelion (*Taraxacum officinale*) and white clover (*Trifolium repens*) in Ohio and Nebraska at a spring and mid-summer timing. Additionally, compositions including pendimethalin or dithiopyr were tested, as shown below in Table 9.

All granular products utilized the MLARS base (0.8 lb. N/1000 $ft^2$). Treatments were applied with a shaker jar and a spreader box. The plots were 3'×3' plot in Ohio and 5'×5' plot in Nebraska, each plot surrounded by 2' buffer strip. The granular treatments were applied to wet foliage either by dew or by a hand sprayer. In Ohio, CE2 was spray-applied to dry foliage at 1.5 gal/1000 $ft^2$ spray volume with a single nozzle consumer applicator wand. In Nebraska, a 3-nozzle boom with 8002vs nozzles and a $CO_2$ backpack sprayer set at 30 PSI was used to apply CE2. For the experiments in this example, the application rate for every composition other than CE2 was 2.856 lb/1000 $ft^2$. The application rate for CE2 was 4 pt/A.

Table 9 shows the formulations and application methods. Inventive Examples 2 and 3 (IE2 and IE3) and Comparative Example 3 (CE3) are granular products utilizing the same fertilizer base as IE1 and CE1 (0.8 lb. N/1000 $ft^2$; N—P—K ratio of 28-0-3). Comparative Example 4 (CE4) is a fertilizer-only product utilizing the same base. CE2 is a sprayed product with no fertilizer base.

TABLE 9

| Example Treatment | Active Ingredient | Application (lb. a.i./A) |
|---|---|---|
| IE1 | 2,4-D | 1.5 |
| | Dicamba | 0.10 |
| | Topramezone | 0.03 |
| IE2 | 2,4-D | 1.5 |
| | Dicamba | 0.10 |
| | Pendimethalin | 1.5 |
| | Topramezone | 0.03 |
| IE3 | 2,4-D | 1.5 |
| | Dicamba | 0.10 |
| | Dithiopyr | 0.25 |
| | Topramezone | 0.03 |
| CE1 | 2,4-D | 1.5 |
| | Dicamba | 0.10 |
| CE2 | 2,4-D | 1.0 |
| | MCPP | 0.26 |
| | Dicamba | 0.10 |
| CE3 | 2,4-D | 1.5 |
| | Dicamba | 0.10 |
| | Pendimethalin | 1.5 |
| CE4 | (fertilizer only) | |
| Non-treated Control | | — |

These experiments were designed in the same manner discussed above for Example 1. The results were similarly collected and analyzed in the same manner discussed above for Example 1.

Treatment Effects (Ohio)

The trials were conducted at peak dandelion bloom in the spring. Dandelion injury (0-10) was evaluated in spring 1 and 2 weeks after application (see Table 10 below).

TABLE 10

| Example Treatment | 7 DAA | 14 DAA |
|---|---|---|
| IE1 | 5.5 a | 7.3 b |
| IE2 | 4.0 a | 8.8 a |
| CE1 | 4.8 a | 5.5 c |
| CE2 | 3.8 bc | 7.8 ab |
| CE3 | 2.3 c | 4.5 c |
| CE4 | 0.0 d | 0.0 d |
| Non-treated Control | 0.0 d | 0.0 d |
| LSD P = .05 | 1.63 | 1.36 |
| Standard Deviation | 1.1 | 0.91 |
| CV | 37.97 | 18.93 |

The treatments formulated with topramezone had the greatest activity of all the granular treatments at 14 DAA. They caused the same amount of injury to dandelion as the sprayable gold standard, CE2. The non-topramezone granular (CE1) caused significantly less injury at 14 days.

Dandelion control (%) was taken at 4, 6, 8, and 10 weeks after application (see Table 11 below). Clover control (%) was taken at 4 WAA, and total weed control was taken at 8 WAA.

TABLE 11

| | Dandelion Control | | | | Clover Control | Overall Weed Control |
|---|---|---|---|---|---|---|
| Treatment | 29 DAA | 44 DAA | 56 DAA | 72 DAA | 29 DAA | 56 DAA |
| IE1 | 98.3 a | 93.5 ab | 91.3 ab | 92.5 b | 99.5 a | 90.8 a |
| IE2 | 98.3 a | 98.0 a | 97.3 a | 99.0 a | 95.0 a | 93.3 a |
| CE1 | 97.0 ab | 97.0 ab | 87.5 ab | 91.5 bc | 82.5 b | 69.5 b |
| CE2 | 95.8 ab | 92.3 ab | 93.3 ab | 95.0 ab | 95.0 a | 93.3 a |
| CE3 | 92.8 b | 88.5 b | 83.3 b | 86.3 c | 60.0 c | 33.8 c |
| CE4 | 0.0 c | 0.0 c | 0.0 c | 0.0 d | 0.0 d | 0.0 d |
| Non-treated Control | 0.0 c | 0.0 c | 0.0 c | 0.0 d | 0.0 d | 0.0 d |
| LSD P = .05 | 4.99 | 9.36 | 11.83 | 5.41 | 10.84 | 17.92 |
| Standard Deviation | 3.36 | 6.3 | 7.97 | 3.64 | 7.3 | 12.06 |
| CV | 4.88 | 9.4 | 12.32 | 5.49 | 11.82 | 22.2 |

At 29 days all herbicides treatments provided excellent dandelion control, however by 44 days, CE3, began to decline (Table 11). The relative lack of efficacy was observed in the % clover control and overall weed control ratings. The two topramezone-based formulas gave excellent control through 72 days. Control was as good as that provided by the sprayable gold standard. CE1 had highly favorable dandelion control but late season clover and overall weed control ratings show it to be less effective than those treatments that included topramezone.

Dandelion injury (0-10) was evaluated in mid-summer between 1-3 weeks (see Table 12 below)

TABLE 12

| Example Treatment | 7 DAA | 9 DAA | 14 DAA | 19 DAA |
|---|---|---|---|---|
| IE1 | 3.8 a | 4.8 a | 6.0 ab | 7.3 ab |
| IE2 | 4.0 a | 4.5 a | 7.3 a | 8.0 a |
| IE3 | 3.8 a | 4.8 a | 6.5 ab | 7.5 ab |
| CE1 | 3.8 a | 4.3 a | 5.3 bc | 6.3 b |
| CE2 | 4.5 a | 4.5 a | 4.3 c | 6.0 b |
| Non-treated Control | 0.0 b | 0.0 b | 0.0 d | 0.0 c |
| LSD P = .05 | 1.13 | 1.62 | 1.34 | 1.51 |
| Standard Deviation | 0.76 | 1.09 | 0.9 | 1.02 |
| CV | 22.92 | 27.43 | 17.37 | 16.25 |

The treatment list for Ohio was changed for the mid-summer timing to focus on the more successful performing treatments. CE3 was replaced with IE3. It was apparent that, by 2 and 3 WAA, all treatments with topramezone were causing much more injury to dandelions than those without. Even the liquid-applied CE2 had statistically inferior symptoms when compared to these treatments. This was likely due to the blackish-brown necrosis that these herbicides cause that is much more visually impactful than the epinasty associated with auxinic herbicides such as CE2. By 3 WAA, the plants treated with a combination of topramezone and auxin-mimic herbicide(s) were nearly dead.

Dandelion control (%) was evaluated in mid-summer between 3-9 weeks (see Table 13 below).

TABLE 13

| Example Treatment | 19 DAA | 28 DAA | 42 DAA | 51 DAA | 65 DAA |
|---|---|---|---|---|---|
| IE1 | 90.0 ab | 93.5 ab | 91.8 a | 92.8 a | 81.3 a |
| IE2 | 90.8 ab | 97.0 a | 92.5 a | 91.3 a | 85.0 a |
| IE3 | 88.8 ab | 95.8 ab | 94.3 a | 94.0 a | 88.8 a |
| CE1 | 77.5 b | 94.8 ab | 93.5 a | 93.3 a | 85.0 a |
| CE2 | 61.3 c | 90.0 b | 94.5 a | 92.5 a | 83.8 a |
| Non-treated Control | 0.0 d | 0.0 c | 0.0 b | 0.0 b | 0.0 b |
| LSD P = .05 | 16.04 | 5.91 | 8.07 | 8.32 | 9.59 |
| Standard Deviation | 10.8 | 3.98 | 5.44 | 5.6 | 6.45 |
| CV | 15.03 | 4.92 | 6.81 | 7.06 | 8.9 |

At the 19 DAA rating, the dandelion control in many of the plots treated with a combination of topramezone and auxin-mimic herbicides exhibited advanced symptomology and warranted a weed control (%) evaluation, which normally is not done until 4 weeks. At 19 DAA, the topramezone-containing treatments had nearly 90% dandelion control or greater while a granular comparison without topramezone had only 77.5% control. Interestingly, the sprayed CE2 had the poorest control of all herbicide combinations. At 4 weeks, the more traditional time frame for an initial % control rating for dandelion, CE2 had caught up with the topramezone treatments as did the granular CE1. All treatments continued to provide excellent dandelion control through the 51 DAA rating. By 65 days, control for all granular treatments began to wane but so did the CE2 showing the longevity of control was not reduced by a granular delivery of the active ingredient. It also indicates the topramezone and its more accelerated dandelion control does not reduce overall long-term efficacy when compared to conventional control methods, CE1 and CE2.

Treatment Effects on Common Dandelion (Nebraska)

Dandelion injury (0-10) was evaluated in spring between 5-28 days after application (see Table 14 below).

TABLE 14

| Example Treatment | 5 DAA | 8 DAA | 14 DAA | 21 DAA | 28 DAA |
|---|---|---|---|---|---|
| IE1 | 3.8 ab | 8.3 a | 8.5 a | 9.0 a | 8.8 a |
| IE2 | 3.8 ab | 8.0 ab | 8.3 a | 9.0 a | 9.3 a |
| CE1 | 4.0 a | 7.5 ab | 7.8 ab | 9.0 a | 9.3 a |
| CE2 | 3.5 b | 6.3 c | 6.5 c | 7.5 c | 6.3 b |
| CE3 | 4.0 a | 7.3 b | 7.3 bc | 8.5 b | 8.0 a |
| CE4 | 0.0 c | 0.0 d | 0.0 d | 0.0 d | 0.0 c |
| Non-treated Control | 0.0 c | 0.0 d | 0.0 d | 0.0 d | 0.0 c |
| LSD P = .05 | 0.49 | 0.94 | 0.89 | 0.46 | 1.49 |
| Standard Deviation | 0.33 | 0.63 | 0.6 | 0.31 | 1 |
| CV | 12.06 | 11.84 | 10.94 | 5.02 | 16.87 |

In many of the trials conducted in Ohio the addition of topramezone noticeably accelerated the injury on dandelion. In this Nebraska trial, all granular treatments caused very similar levels of dandelion injury regardless of the inclusion of topramezone (Table 14). Interestingly, they all tended to have better initial injury than the sprayable CE2 gold standard. The CE4 fertilizer blank caused no weed injury.

Dandelion control (%) was evaluated in spring between 4-10 weeks (see Table 15 below).

TABLE 15

| Example Treatment | 28 DAA | 42 DAA | 56 DAA | 70 DAA |
|---|---|---|---|---|
| IE1 | 92.5 a | 88.8 ab | 93.8 a | 92.5 a |
| IE2 | 92.5 a | 92 ab | 95.8 a | 92.5 a |
| CE1 | 96.3 a | 95 a | 98 a | 95 a |
| CE2 | 57.5 b | 43.8 c | 40.0 c | 32.5 c |
| CE3 | 80.0 a | 73.8 b | 78.8 b | 70.0 b |
| CE4 | 0 c | 0 d | 0 d | 0 d |
| Non-treated Control | 0 c | 0 d | 0 d | 0 d |
| LSD P = .05 | 16.5 | 18.78 | 14.31 | 18.34 |
| Standard Deviation | 11.1 | 12.64 | 9.63 | 12.34 |
| CV | 18.56 | 22.51 | 16.6 | 22.59 |

As this dandelion control trial reached the 28-day mark, the data began to show that CE3 not doing as well as the other granular formulas as it provided only minimally acceptable weed control at that time and then was unacceptable thereafter. Those treatments that include topramezone and the two-way combination of 2,4-D+Dicamba provided highly acceptable dandelion control through 70 days all of which did significantly better than the gold standard CE2.

Dandelion injury (0-10) was evaluated in mid-summer between 4-21 days after application (see Table 16 below).

TABLE 16

| Example Treatment | 4 DAA | 7 DAA | 14 DAA | 21 DAA |
|---|---|---|---|---|
| IE1 | 2.8 a | 4.8 a | 7.0 a | 10.0 a |
| IE2 | 2.3 ab | 4 ab | 7.0 a | 9.5 ab |
| CE1 | 2.3 ab | 4.3 ab | 6.5 a | 9.3 ab |
| CE2 | 1.8 b | 2.5 c | 6.0 a | 8.8 b |
| CE3 | 2.3 ab | 3.5 bc | 6.5 a | 9.5 ab |
| CE4 | 0.0 c | 0.0 d | 0.0 b | 0.0 c |
| Non-treated Control | 0.0 c | 0.0 d | 0.0 b | 0.0 c |
| LSD P = .05 | 0.67 | 1.13 | 1.06 | 0.75 |
| Standard Deviation | 0.45 | 0.76 | 0.71 | 0.51 |
| CV | 28 | 28 | 15.12 | 7.56 |

In many of the trials conducted in Ohio, the addition of topramezone noticeably accelerated dandelion injury. In this Nebraska trial initiated mid-summer, all granular treatments caused very similar levels of dandelion injury regardless of the inclusion of topramezone. Interestingly, they all tended to exhibit greater weed injury than the sprayable CE2 gold standard. The CE4 fertilizer blank caused no weed injury.

Dandelion control (%) was evaluated in mid-summer between 4-10 weeks after application (see Table 17 below).

TABLE 17

| Example Treatment | 28 DAA | 42 DAA | 53 DAA | 70 DAA |
|---|---|---|---|---|
| IE1 | 100.0 a | 93.8 a | 91.3 a | 72.5 a |
| IE2 | 97.5 a | 85 ab | 72.5 c | 40 b |
| CE1 | 96.3 a | 85 ab | 86.8 ab | 78.8 a |
| CE2 | 91.3 b | 77.5 b | 77.5 bc | 43.8 b |
| CE3 | 96.3 a | 92.5 a | 92.5 a | 80.0 a |
| Non-treated Control | 0.0 c | 0.0 c | 0.0 d | 0.0 c |
| LSD P = .05 | 4.58 | 10.4 | 11.2 | 19.76 |
| Standard Deviation | 3.09 | 6.97 | 7.53 | 13.3 |
| CV | 4.49 | 11.2 | 12.5 | 29.56 |

The application of IE1 provided clean plots at the 4-week weed control rating. The other granular formulations were not significantly different as they also provided highly acceptable dandelion control. Sprayable CE2 gave significantly less weed control than all the granular treatments at the 4-week rating. As time progressed to the 10 week rating, certain treatments had a dramatic loss in weed control— especially IE2 and CE2. IE1, CE1, and CE3 also had a decline in control but not to the level as the previously mentioned treatments.

Treatment Effects on White Clover (Ohio)

Clover injury (0-10) was evaluated in spring between 3-18 days after application (see Table 18 below).

TABLE 18

| Example Treatment | 3 DAA | 10 DAA | 13 DAA | 18 DAA |
|---|---|---|---|---|
| IE1 | 3 a | 5.3 ab | 6.8 ab | 8 a |
| IE2 | 3 a | 4.3 bc | 4.8 c | 8.3 a |
| CE1 | 2.5 a | 3.3 c | 5.3 bc | 7.5 a |
| CE2 | 3 a | 6.3 a | 7.5 a | 7.8 a |
| CE3 | 2.8 a | 3.8 c | 4.5 c | 6.5 b |
| CE4 | 1 b | 0 d | 1.8 d | 0 c |
| Non-treated Control | 0 c | 0 d | 0.8 d | 0 c |
| LSD P = .05 | 0.93 | 1.09 | 1.94 | 0.92 |
| Standard Deviation | 0.63 | 0.73 | 1.31 | 0.62 |
| CV | 28.77 | 22.52 | 29.29 | 11.43 |

In Ohio, CE2 spray tended to cause the greatest injury to clover at this peak season application. The one treatment that was closest to its efficacy during the initial 2 weeks was IE1. However, by 18 days, IE2 and CE1 were causing just as much injury as CE2. The CE3 had inferior results that could not be explained.

Clover control (%) was evaluated in spring between 3-10 weeks after application (see Table 19 below).

TABLE 19

| Example Treatment | 18 DAA | 28 DAA | 41 DAA | 56 DAA | 70 DAA |
|---|---|---|---|---|---|
| IE1 | 90 a | 97.3 a | 97 a | 96.5 a | 95.5 a |
| IE2 | 88.8 a | 97 a | 97.8 a | 95.3 a | 94.8 a |
| CE1 | 87.5 a | 89.8 b | 89.5 b | 77.5 b | 85 ab |
| CE2 | 87.5 a | 96.5 a | 98.3 a | 95.3 a | 93.5 a |
| CE3 | 73.8 b | 77.5 c | 73.8 c | 61.3 c | 56.3 b |
| CE4 | 0 c | 0 d | 0 d | 0 d | 15 c |
| Non-treated Control | 0 c | 0 d | 0 d | 0 d | 0 c |
| LSD P = .05 | 8.82 | 5.24 | 6.66 | 15.74 | 32 |
| Standard Deviation | 5.93 | 3.53 | 4.49 | 10.59 | 21.54 |
| CV | 9.72 | 5.39 | 6.88 | 17.42 | 34.26 |

Through the 70-day duration of the trial CE2 gave excellent clover control but was not significantly different than the two topramezone-based treatments. CE1 had significantly less clover control showing the benefit of adding topramezone in IE1. CE3 had the poorest performance.

Clover injury (0-10) was evaluated in mid-summer at 1 and 2 weeks after application (see Table 20 below).

TABLE 20

| Example Treatment | 7 DAA | 14 DAA |
|---|---|---|
| IE1 | 3.8 ab | 6.8 a |
| IE2 | 3.3 ab | 6.5a |
| IE3 | 4.0 ab | 6.5 a |
| CE1 | 3.0 b | 5.8 a |
| CE2 | 4.5 a | 6.0a |
| Non-treated Control | 0.0 c | 0.0 b |
| LSD P = .05 | 1.43 | 1.29 |
| Standard Deviation | 0.96 | 0.87 |
| CV | 29.92 | 16.04 |

While the mid-summer applications of topramezone provided visually impactful symptomology on dandelion early in the trial, this effect was not so much realized on clover when compared to the non-topramezone treatments. All treatments gave very similar intensities of clover injury during the first 2 weeks of the trial.

Clover and dandelion control (%) were evaluated in mid-summer between 3-8 weeks (see Table 21 below).

TABLE 21

| Example | % Clover Control | | | | % Dandelion Control | |
|---|---|---|---|---|---|---|
| Treatment | 21 DAA | 28 DAA | 42 DAA | 56 DAA | 21 DAA | 28 DAA |
| IE1 | 92.5 ab | 96.3 ab | 96.3 bc | 90.0 ab | 88.8 abc | 98.5 a |
| IE2 | 95.8 a | 98.5 a | 99 ab | 93.3 ab | 91 ab | 98.5 a |
| IE3 | 96.8 a | 98.8 a | 100.0 a | 96.8 a | 85.0 bc | 95.5 ab |
| CE1 | 84.5 b | 94.5 ab | 95.3 c | 87.5 b | 86.3 abc | 96.8 ab |
| CE2 | 90.8 ab | 97.5 ab | 98.3 ab | 96.8 a | 80.0 c | 94.5 ab |
| Non-treated Control | 0 c | 0.0 c | 0.0 d | 0.0 c | 0.0 d | 0.0 c |
| LSD P = .05 | 10.08 | 5.9 | 2.91 | 6.8 | 9.46 | 5.96 |
| Standard Deviation | 6.79 | 3.97 | 1.96 | 4.58 | 6.37 | 4.01 |
| CV | 8.62 | 4.81 | 2.34 | 5.81 | 8.48 | 4.87 |

At 3 weeks, all topramezone treatments and CE2 provided 90%+ clover control. Granular CE1 was somewhat slower in its ability to control clover, but, by the 4-week rating, it was not statistically different than all other treatments. Through the remainder of the trial, all treatments provided excellent clover control. Within the study site, there was a considerable population of dandelion, so ratings were taken on this weed as well at 3 and 4 weeks after application. All treatments provided highly acceptable dandelion control supporting the findings in the previously reported dandelion trial.

Treatment Effects on White Clover (Nebraska)

Clover injury (0-10) was evaluated in spring between 5-28 days after application (see Table 22 below).

TABLE 22

| Example Treatment | 5 DAA | 8 DAA | 14 DAA | 21 DAA | 28 DAA |
|---|---|---|---|---|---|
| IE1 | 2.0 ab | 4.8 a | 6.8 ab | 8.0 a | 8.8 a |
| IE2 | 2 ab | 5.3 a | 7.3 a | 8.3 a | 8.8 a |
| CE1 | 2.3 a | 5 a | 6.3 abc | 7.3 a | 6.8 ab |
| CE2 | 1.0 c | 3.3 b | 5.0 c | 6.8 a | 5.5 b |
| CE3 | 2.3 a | 4.8 a | 5.5 bc | 7.0 a | 6.3 ab |
| CE4 | 1.5 bc | 2.0 b | 1.0 d | 0.3 b | 0.5 c |
| Non-treated Control | 0.0 d | 0.0 c | 0.0 d | 0.0 b | 0.0 c |
| LSD P = .05 | 0.52 | 1.38 | 1.5 | 1.97 | 2.76 |
| Standard Deviation | 0.35 | 0.93 | 1.01 | 1.33 | 1.86 |
| CV | 22.32 | 26.04 | 22.22 | 24.78 | 35.67 |

These herbicides performed similarly on clover as they did on dandelion in that all granular formulas were very similar to one another in their speed of activity and that they all were notably faster in activity than the liquid-applied CE2. In this trial, the CE4 fertilizer blank caused a slight amount of injury to the clover which then fully recovered.

White clover control (%) was evaluated in spring between 4-10 weeks after application (see Table 23 below).

TABLE 23

| Example Treatment | 28 DAA | 42 DAA | 56 DAA | 70 DAA |
|---|---|---|---|---|
| IE1 | 86.3 a | 85.0 a | 88.8 a | 92.0 a |
| IE2 | 89.5 a | 87 a | 89.8 a | 90.5 a |
| CE1 | 70 ab | 57.5 a | 71.3 a | 75.8 ab |
| CE2 | 55.0 b | 51.3 a | 63.8 a | 71.3 ab |
| CE3 | 70.0 ab | 60.0 a | 63.8 a | 60.0 b |
| CE4 | 0.0 c | 0.0 b | 0.0 b | 0.0 c |

TABLE 23-continued

| Example Treatment | 28 DAA | 42 DAA | 56 DAA | 70 DAA |
|---|---|---|---|---|
| Non-treated Control | 0.0 c | 0.0 b | 0.0 b | 0.0 c |
| LSD P = .05 | 30.2 | 36.37 | 28.63 | 28.17 |
| Standard Deviation | 20.33 | 24.48 | 19.27 | 18.96 |
| CV | 38.38 | 50.29 | 35.76 | 34.07 |

This trial tended to exhibit the benefit of the topramezone as IE1 and IE2 were the only treatments that provided acceptable control of clover. Granular treatments that lacked topramezone and the sprayed CE2 did not provide acceptable results (80% or higher) at any rating date. As seen in the other parameters of these spring broadleaf trials in Nebraska, CE2 tended to lag in its ability to control clover. This lack of efficacy by the gold standard could not be explained.

Clover injury (0-10) was evaluated in mid-summer between 4-21 days after application (see Table 24 below).

TABLE 24

| Example Treatment | 4 DAA | 7 DAA | 14 DAA | 21 DAA |
|---|---|---|---|---|
| IE1 | 2.0 a | 5.0 a | 6.8 a | 9.0 a |
| IE2 | 2 a | 5 a | 6.8 a | 9 a |
| CE1 | 1.5 b | 4.3 a | 6.5 a | 8.8 a |
| CE2 | 1.0 c | 4.5 a | 6.3 a | 8.8 a |
| CE3 | 2.0 a | 4.5 a | 6.8 a | 8.8 a |
| CE4 | 0.0 d | 0.0 b | 0.0 b | 0.0 b |
| Non-treated Control | 0.0 d | 0.0 b | 0.0 b | 0.0 b |
| LSD P = .05 | 0.32 | 1.08 | 0.65 | 0.51 |
| Standard Deviation | 0.22 | 0.73 | 0.44 | 0.35 |
| CV | 17.97 | 21.87 | 9.26 | 5.46 |

The injury these granular and liquid products applied in mid-summer caused on clover was quite similar through the duration of the trial. At no time did topramezone significantly increase injury of clover beyond what granular CE1 and CE3 caused. All granular treatments were very similar to the sprayed CE2.

White clover control (%) was evaluated in mid-summer between 4-10 weeks after application (see Table 25 below).

TABLE 25

| Example Treatment | 28 DAA | 42 DAA | 53 DAA | 70 DAA |
|---|---|---|---|---|
| IE1 | 97.5 a | 97.8 ab | 99.8 ab | 99.8 a |
| IE2 | 97.5 a | 98.8 a | 100 a | 99.8 a |
| CE1 | 97.5 a | 98.3 a | 99.8 ab | 99.3 ab |
| CE2 | 95.8 a | 96.8 b | 99.3 b | 97.8 b |
| CE3 | 97.5 a | 98.5 a | 99.5 ab | 98.5 ab |
| CE4 | 0.0 b | 0.0 c | 0.0 c | 0.0 c |
| Non-treated Control | 0.0 b | 0.0 c | 0.0 c | 0.0 c |
| LSD P = .05 | 1.97 | 1.45 | 0.59 | 1.87 |
| Standard Deviation | 1.32 | 0.98 | 0.4 | 1.26 |
| CV | 1.91 | 1.39 | 0.56 | 1.78 |

Clover was very susceptible to all treatments at this mid-summer application timing in Nebraska. Excellent clover control was maintained through the 10-week rating period.

Conclusions

In most cases, the addition of topramezone provided accelerated visual weed injury symptoms and improved control of dandelion and clover when compared to herbicide combinations without. Sometimes, the effects of this additive out-paced the efficacy of CE2, a sprayed gold standard treatment. The accelerated activity brought about by topramezone did not reduce long-term efficacy of either weed species as can happen when perennial weeds are "killed" too quickly triggering rapid regrowth. Weed control tended to be just as effective in the spring peak period as they were in the mid-summer trial. Additionally, the weed control efficacy of CE3 was not inferior when compared to CE1. As such, the addition of pendimethalin does not alter the final results.

Example 3

Experiments were conducted to explore the capabilities of topramezone for its ability to enhance the effectiveness of controlling two key broadleaf weeds. The experiments were conducted on common dandelion (*Taraxacum officinale*) and white clover (*Trifolium repens*) in Ohio at an early summer timing. The study site had good populations of both dandelion and white clover so both were evaluated together and assessed as overall weed control.

Treatments were applied with a shaker jar. The plots were 3'×6' and were surrounded by 2' buffer strip. The granular treatments applied to wet turf by a hand sprayer. CE2 was applied at 1.5 gal/1000 $ft^2$ spray volume with a single nozzle consumer applicator wand.

Table 26 shows the formulations and application methods. IE2, CE1, CE2, Comparative Example 5 (CE5), and Comparative Example 6 (CE6) are granular products and were applied to wet foliage. CE2 is a liquid product with no fertilizer base and was sprayed on dry foliage. CE5 is a granular product utilizing the same fertilizer base as described above (0.8 lb. N/1000 $ft^2$; N—P—K ratio of 28-0-3). CE6 was formulated with a physical mixture of the same fertilizer base and clay.

TABLE 26

| Example Treatment | Active Ingredient | Application (lb. a.i./A) | N-P-K |
|---|---|---|---|
| IE2 | | | 28-0-3 |
| | 2,4-D | 1.5 | |
| | Dicamba | 0.10 | |
| | Pendimethalin | 1.5 | |
| | Topramezone | 0.03 | |
| CE1 | | | 28-0-3 |
| | 2,4-D | 1.5 | |
| | Dicamba | 0.10 | |
| CE2 | | | 0-0-0 |
| | 2,4-D | 1.0 | |
| | MCPP | 0.26 | |
| | Dicamba | 0.10 | |
| CE5 | | | 28-0-3 |
| | 2,4-D | 1.5 | |
| | MCPP-p | 0.75 | |
| CE6 | | | 16-0-1 |
| | 2,4-D | 1.5 | |
| | MCPP-p | 0.75 | |
| | Pendimethalin | 1.75 | |

These experiments were designed in the same manner discussed above for Example 1. The results were similarly collected and analyzed in the same manner discussed above for Example 1.

The application rate for CE2 was 4 pt/A, and the application rate for CE6 was 5.0 lb/1000 $ft^2$. The application rate for every other composition was 2.856 lb/1000 $ft^2$.

Overall weed control (%) was measured between 2-10 weeks after application (see Table 27 below).

TABLE 27

| Treatment | 2 WAA | 4 WAA | 6 WAA | 8 WAA | 10 WAA |
|---|---|---|---|---|---|
| IE2 | 88.8 a | 99.0 a | 96.5 a | 94.0- | 88.8 a |
| CE1 | 68.8 ab | 97.5 a | 97.5 a | 96.8- | 93.8 a |

TABLE 27-continued

| Treatment | 2 WAA | 4 WAA | 6 WAA | 8 WAA | 10 WAA |
|---|---|---|---|---|---|
| CE2 | 63.8 b | 98.5 a | 98.8 a | 96.8- | 95.0 a |
| CE5 | 57.5 b | 94.5 ab | 89.8 abc | 80.8- | 77.5 b |
| CE6 | 56.3 b | 90 b | 85.8 bc | 70- | 67.5 bc |
| LSDP = .05 | 20.52 | 5.17 | 10.73 | 22.09 | 11.25 |
| Standard Deviation | 13.81 | 3.48 | 7.23 | 14.87 | 7.57 |
| CV | 21.31 | 3.63 | 7.82 | 17.62 | 9.53 |

One of the key observations of this trial is the dynamic weed injury associated with the topramezone treatment (IE2) observed as early as 2 weeks after application. It was at this time dandelion and clover had so much injury/density loss that weed control was rated at a time which is about 2 weeks too early for conventional treatments. At that 2 week rating, it is apparent that IE2 with topramezone had noticeably greater control when compared to the other treatments—including the sprayed gold standard, CE2. By 4 weeks, all other treatments had caught up the level of control provided by IE2.

As the trial progressed through the 10-week rating, the sprayed gold standard, CE2, had the best overall weed control rating but was not significantly different than the two other formulas that contained 2,4-D+dicamba—CE1 and IE2. All other treatments were statistically inferior and did not provide a minimum desired level of broadleaf weed control (80%). These included CE5 and CE6 both of which include 2,4-D+MCPP-p.

Conclusions

The addition of topramezone provided accelerated injury of dandelion and clover when compared to herbicide combinations without. Sometimes, the visual effects of topramezone out-paced those of CE2, a sprayed gold standard treatment.

IE2 and CE1 provided the best overall weed control results for the greatest duration of time. Both of these treatments included the active ingredients 2,4-D+dicamba. Of those two treatments, only one provided acceptable weed control as soon as 2 weeks after application—IE2. This accelerated activity was brought about by topramezone. Early results were improved even when compared to the sprayed gold standard, CE2.

Example 4

Experiments were conducted in Ohio and Nebraska in June to evaluate the relative contributions of topramezone (without a PRE herbicide) and in combination with either dithiopyr or pendimethalin (PRE herbicides) for post-emergence (3-5 Leaf) crabgrass control when formulated on a fertilizer particle. The experiments were conducted on large crabgrass (*Digitaria sanguinalis*) in Ohio and on smooth crabgrass (*Digitaria ischaemum*) in Nebraska.

At both research sites, crabgrass pressure was encouraged by scalping the turf weekly to encourage crabgrass germination and development. At both locations the trial was conducted on crabgrass stand with a majority of the population at the at the 3-5 leaf stage. Preceding application, mowing was withheld for 48 hours to ensure sufficient weed leaf area was present for absorption. The experimental unit for turfgrass post-emergent weed control testing was an individual plot measuring 3'×3' in Ohio and 5'×5' in Nebraska. The research area for turfgrass post-emergence weed control testing contained crabgrass in sufficient quantity and uniformity such that product performance could be accurately and consistently assessed. Plots were separated on each side by a 2 ft. untreated buffer strip. Products were pre-measured and hand-applied to each plot via a shaker jar. In Ohio, a spreader box was also used to help disperse granules uniformly. All treatments were applied to wet foliage and allowed to sit on the leaf surface for 24-48 hr before being watered in. Following application, mowing did not occur until the treatments were watered in.

Table 28 shows the formulations. IE4, IE5, and Comparative Examples 7-9 (CE7, CE8, and CE9) are granular products utilizing the same fertilizer base (0.8 lb. N/1000 $ft^2$), which has a N—P—K ratio of 28-0-3. A commercially-available granular composition (Comparative Example 10; CE10) was used as a comparison and has a fertilizer base with a N—P—K ratio of 16-0-1. For the experiments in this example, the application rate for every composition other than CE10 was 2.856 lb/1000 $ft^2$. The application rate for CE10 was 5.0 lb/1000 $ft^2$.

TABLE 28

| Example Treatment | Active Ingredient | Application (lb. a.i./A) |
|---|---|---|
| IE1 | 2,4-D | 1.5 |
| | Dicamba | 0.1 |
| | Topramezone | 0.03 |
| | 2,4-D | 1.5 |
| IE3 | 2,4-D | 1.5 |
| | Dicamba | 0.1 |
| | Dithiopyr | 0.25 |
| | Topramezone | 0.03 |
| IE4 | 2,4-D | 1.5 |
| | Dicamba | 0.1 |
| | Pendimethalin | 1.75 |
| | Topramezone | 0.03 |
| IE5 | 2,4-D | 1.5 |
| | Dicamba | 0.1 |
| | Dithiopyr | 0.5 |
| | Topramezone | 0.03 |
| CE7 | Pendimethalin | 1.75 |
| CE8 | Dithiopyr | 0.25 |
| CE9 | Dithiopyr | 0.5 |
| CE10 | 2,4-D | 1.5 |
| | MCPP-p | 0.75 |
| | Pendimethalin | 1.76 |
| Non-treated Control | | |

Weed injury (0-10) of crabgrass following application of treatments in the deep dive into crabgrass control in Nebraska (see Table 29 below).

TABLE 29

| Treatment | 3 DAA | 7 DAA | 9 DAA | 14 DAA |
|---|---|---|---|---|
| IE1 | 1.5 a | 5.5 a | 5.8 a | 6 c |
| IE3 | 2 a | 5.5 a | 6.5 a | 7.8 a |
| IE4 | 2 a | 6 a | 6 a | 7 ab |
| IE5 | 2 a | 5 a | 6 a | 7.8 a |
| CE7 | 0 b | 0 c | 0.8 c | 3.3 d |
| CE8 | 0 b | 0.5 bc | 2.3 b | 5.8 c |
| CE9 | 0.3 b | 1.5 b | 2.3 b | 6.5 bc |
| CE10 | 0.3 b | 0 c | 0 c | 0.3 e |
| Non-treated Control | 0.5 b | 1.5 b | 0.5 c | 0 e |
| LSD P = 0.05 | 0.68 | 1.26 | 1.17 | 0.83 |
| Standard Deviation | 0.46 | 0.87 | 0.8 | 0.57 |
| CV | 49.13 | 30.57 | 24.07 | 11.58 |

Crabgrass injury was first observed 3 DAA with all treatments containing topramezone (IE1, IE3-IE5) showing greater injury than treatments not containing topramezone. By 7 DAA, injury symptoms from treatments containing topramezone continued to progress ranging from 5.5-6.5, whereas no other treatment had an injury rating above 1.5. At 9 DAA, these trends held true. Interestingly, at 14 DAA, treatments containing both topramezone and dithiopyr (IE3 and IE5) had the highest means but were not statistically greater than IE4. Regardless of rate, dithiopyr alone, CE8 and CE9, caused more crabgrass injury than pendimethalin alone, CE7, with injury between 5.8-6.5. Accordingly, the results showed that the inclusion of topramezone generally caused crabgrass injury symptoms earlier and caused more symptomology than treatments that did not contain topramezone.

Weed injury (0-10) of crabgrass following application of treatments in the deep dive into crabgrass control in Marysville, OH (see Table 30 below).

TABLE 30

| Treatment | 7 DAA |
|---|---|
| IE1 | 3.3 a |
| IE3 | 2 b |
| IE4 | 3.8 a |
| IE5 | 2 b |
| CE7 | 0 c |
| CE8 | 0 c |
| CE9 | 0 c |
| CE10 | 0 c |
| Non-treated Control | 0 c |
| LSD P = .05 | 0.7 |
| Standard Deviation | 0.48 |
| CV | 39.17 |

Crabgrass injury in Ohio was first observed 7 DAA when the treatments containing topramezone were only treatments showing crabgrass injury. Injury was observed as leaf whitening. At this time, it was also observed that treatments with both topramezone and dithiopyr (IE3 and IE5) did not have as severe of leaf whitening compared to treatments that contained topramezone without dithiopyr (IE1 and IE4) (FIGS. 1 and 2). Note the subdued leaf whitening in FIG. 2 and how the crabgrass plants appear to be stunted compared to the plants treated with the pendimethalin based formula in FIG. 1.

Weed control (%) of crabgrass was evaluated following application of treatments in Nebraska and Ohio (see Table 31 below).

TABLE 31

| | Nebraska (DAA) | | Ohio (DAA) | | Pooled* (DAA) | |
|---|---|---|---|---|---|---|
| Treatment | 28 | 42 | 28 | 42 | 56 | 70 |
| IE1 | 62.5 c | 42.5 c | 48.8 c | 32.5 c | 29.4 cd | 25 de |
| IE3 | 95.8a | 95 a | 93.3a | 85 a | 91.9a | 86.3a |
| IE4 | 78.8 b | 67.5 b | 53.8 c | 22.5 c | 38.1 c | 36.3 cd |
| IE5 | 97.5 a | 95.3 a | 98.3 a | 97.3 a | 95.6 a | 88.4 ab |
| CE7 | 32.5 d | 13.8 d | 0 d | 0 d | 8.75 e | 10 ef |
| CE8 | 86.3 ab | 76.3 ab | 72.5 b | 67.5 b | 62.5 b | 65 be |
| CE9 | 96.3 a | 94.5 a | 97.5 a | 96.5 a | 94.5 a | 90.8 a |
| CE10 | 10 e | 2.5d | 0 d | 0 d | 11.9 de | 10.6 ef |
| Non-treated Control | 0 e | 0 d | 0 d | 0 d | 0 e | 0 f |
| LSD P = .05 | 13.7 | 20.3 | 15.35 | 16.53 | | |
| Standard Deviation | 9.35 | 13.9 | 10.52 | 11.33 | 17.8 | 19.2 |
| CV | 15 | 25.7 | 20.4 | 25.41 | | |

*Data at 56 and 70 DAA were pooled between locations because no treatment by location interaction was detected.

Initial crabgrass control ratings were taken at 28 DAA at both locations and results were statistically different and therefore they could not be pooled. However, in both Nebraska and Ohio, the same three treatments provided excellent control of crabgrass with IE3, IE5, and CE9 all providing over 90% control. Dithiopyr alone, CE8 and CE9, provided decent control at both locations (72-97%). There was a noticeable rate response with less control at the lower dithiopyr rate, CE8. However, the rate response was only statistically significant at Ohio. While CE9 consistently provided excellent control, dithiopyr 0.25 lb paired with topramezone (IE3) increased levels of control above CE8, dithiopyr 0.25 lb alone, and resulted in near complete control of crabgrass. When topramezone was paired with pendimethalin (IE4) or applied without a pre-emergence herbicide (IE1), control was generally lower ranging from 48-78%. As expected, pendimethalin alone (CE7) provided negligible levels of control.

At 42 DAA, the results from the two locations were again significantly different and could not be pooled. Control from 28 to 42 DAA declined for every treatment with some treatments recovering more than others. Again, IE3, IE5, and CE9 were the best performing treatments. Those treatments containing dithiopyr at 0.5 lb (IE5 and CE9) provided crabgrass control greater than 94% control. IE3 still had acceptable levels of control with 95% control at Nebraska and 85% control in Ohio. The control provided by dithiopyr 0.25 lb alone (CE8) had declined with 76% control at Nebraska and 67% at Ohio. Similar to 28 DAA, at both locations, treatments not containing dithiopyr generally had poor control (i.e., less than 67% control).

Data between locations were statistically similar at 56 and 70 DAA and were therefore pooled across location. Control was sustained for treatments; IE3, IE5, and CE9 never dropping below 86%. Crabgrass control was significantly inferior for all other treatments at 56 DAA with no other treatment having greater than 38% control. Given that dithiopyr 0.25 lb alone (CE8) only had 65% control at 70 DAA, and topramezone without a pre-emergence herbicide only resulted in 25% control at 70 DAA, the results indicate that neither herbicides alone are a suitable option for post-emergent control of crabgrass when applied as a granule. However, when combined, these herbicides work together for improved results.

Despite the differences in crabgrass species and locations tested, the statistical similarity at 56 and 70 DAA between these data indicate that treatment performances were repeatable across locations and crabgrass species, making these results more robust. IE3, IE5, and CE9 provided good post-control when applied to crabgrass at the 3-5 leaf stage with effective season long suppression. IE3, which includes topramezone and dithiopyr 0.25, provided acceptable results whereas CE8 (dithiopyr 0.25 alone) was not as effective. Topramezone, when formulated without a pre-emergent herbicide (IE1) or with pendimethalin (IE4), resulted in poor levels of post-emergent crabgrass control (i.e., less than 37% control 70 DAA) indicating that topramezone provides little to no control as a granular treatment for post-emergent crabgrass control when not in the presence of dithiopyr. Additionally, the combination of dithiopyr and topramezone reduced the foliar whitening and visual impact caused by the topramezone without dithiopyr providing a more acceptable consumer experience.

Example 5

A research trial was conducted in Ohio evaluating compositions for post-emergence crabgrass control. This trial evaluates compositions for post-emergence crabgrass control at the 6+ tiller (mature) growth stage. The experimental unit for turfgrass post-emergent weed control testing was 3'×3'. Plots were separated on each side by a 2 ft. untreated buffer strip.

Prior to starting the trial, in the early spring crabgrass pressure was encouraged by scalping the turf weekly to encourage crabgrass germination and development. When crabgrass germinated and became apparent in the turf canopy, mowing heights were raised back to the original 3" mowing height to replicate a more realistic scenario. Preceding treatment application, mowing was withheld for 48 hours to ensure sufficient weed leaf area is present for herbicide absorption. The research area contained crabgrass in sufficient quantity and uniformity such that product performance could be accurately and consistently assessed.

Granular products were pre-measured and hand-applied to each plot via a shaker jar and a spreader box to help disperse granules uniformly. Granular formulas were applied in the early morning to natural dew. Following application mowing did not occur until the treatments had been watered in 48 hrs after application. Plots received irrigation on two days after application to water in products. For the experiments in this example, the application rate of the granular products, IE1-IE3 and CE11, are 2.86 lb/M, and the application rate for CE12 is 1.5 fl. oz./A.

The compositions and application rates are shown in Table 32 below. Comparative Example 11 (CE11) is a granular product utilizing the same fertilizer base as described above (0.8 lb. N/1000 ft$^2$; N—P—K ratio of 28-0-3). The treatments were compared to the industry standard for crabgrass control—Pylex—mixed with a crop oil concentrate (COC) (Comparative Example 12; CE12) and a non-treated control. CE12 is a sprayed product with no fertilizer base.

TABLE 32

| Example Treatment | Active Ingredient | Application (lb. a.i./A) |
|---|---|---|
| IE1 | 2,4-D | 1.5 |
| | Dicamba | 0.1 |
| | Topramezone | 0.03 |
| IE2 | 2,4-D | 1.5 |
| | Dicamba | 0.1 |
| | Pendimethalin | 1.5 |
| | Topramezone | 0.03 |
| IE3 | 2,4-D | 1.5 |
| | Dicamba | 0.1 |
| | Dithiopyr | 0.25 |
| | Topramezone | 0.03 |
| CE11 | Topramezone | 0.03 |
| CE12 | Topramezone | 0.03 |
| Non-treated control | | |

These experiments were designed in the same manner discussed above for Example 1. The results were similarly collected and analyzed in the same manner discussed above for Example 1.

Crabgrass injury (0-10) was measured between 3-21 days after application (see Table 33 below).

TABLE 33

| Example Treatment | 3 DAA | 8 DAA | 13 DAA | 21 DAA |
|---|---|---|---|---|
| IE1 | 1- | 5 b | 4 bc | 3 cd |
| IE2 | 1- | 4 b | 4 c | 2 d |
| IE3 | 0- | 3 c | 2 d | 5 b |
| CE11 | 2- | 6 a | 5 b | 3 cd |
| CE12 | 1- | 6 a | 8 a | 9 a |
| Non-treated control | 1- | 0 d | 0 e | 0 e |
| LSD P = .05 | 0.82 | 0.84 | 1.15 | 1.06 |
| Standard Deviation | 0.55 | 0.57 | 0.78 | 0.71 |
| CV | 69.9 | 14.43 | 19.24 | 20.79 |

On the first crabgrass injury rating 3 DAA, no significant injury was observed. At 8 DAA, injury was observed from all treatments. Pylex (CE12) and topramezone alone (CE11) were in the highest statistical performing group each with 5.5 injury ratings. Injury from topramezone saw a slightly decline in injury when paired with 2,4-D and dicamba, but the numerical difference between the injury ratings were small and not always statistically significant. The treatment with the lowest injury rating score was IE3, which contained 2,4-D, dicamba, dithiopyr, and topramezone. It was noticed that crabgrass was not growing as rapidly and had significantly less leaf whitening compared to other treatments with higher injury ratings.

By thirteen days after application, sprayed Pylex (CE12) had separated itself from the experimental treatments as having the greatest amount of weed injury with a rating of 8. The experimental formula that contained topramezone alone (CE11) and 2,4-D+dicamba+topramezone (IE1) were in the second best performing statistical category with 5.0 and 4.3 injury ratings, respectively. The treatment containing both dithiopyr and topramezone (IE3) again had the lowest injury rating amongst all treatments.

The final injury rating at 21 days after application showed leaf whitening from most granular topramezone treatments had dissipated with the exception of IE3, which contained dithiopyr and topramezone, which increased in crabgrass injury. Leaf necrosis, root clubbing, and overall stunting and plant decline was observed.

Granular treatments containing topramezone often show good initial results but the crabgrass often recovered. One exception was 2,4-D+dicamba+dithiopyr+topramezone (IE3), which had the highest injury rating on the final injury rating date among the compositions other than the Pylex (CE12). A large performance gap between sprayed Pylex and granular forms of topramezone exists but is also to be expected given the coverage differences between the two products.

Crabgrass control (%) was measured between 3-8 weeks (see Table 34 below).

TABLE 34

| Example Treatment | 21 DAA | 28 DAA | 43 DAA | 56 DAA |
|---|---|---|---|---|
| IE1 | 13 de | 18 cde | 18 cd | 38 bc |
| IE2 | 15 d | 18 cd | 18 cd | 40 bc |
| IE3 | 74 b | 81 a | 86 a | 86 a |
| CE11 | 38 c | 40 b | 38 bc | 64 ab |
| CE12 | 93 a | 95 a | 96 a | 95 a |
| Non-treated control | 0 e | 0 d | 0 d | 18 c |
| LSD P = .05 | 14.88 | 20.43 | 23.33 | 33.41 |
| Standard Deviation | 10.02 | 13.75 | 15.7 | 22.49 |
| CV | 26.76 | 34.2 | 36.88 | 39.11 |

On the first crabgrass control rating date, 21 days after application, CE12 was providing the greatest level of control with 93% control. The dithiopyr+topramezone combination of IE3 continued to develop injury and had a control rating of 74% control. No other treatment had greater than 43% control through 43 DAA. Dithiopyr+topramezone (IE3) saw control levels continue to rise at 28 and 42 DAA with control of 81 and 86% control. Stunted crabgrass plants were eventually overwhelmed by the thriving turf canopy and, over time, were no longer visible. It is theorized that some of the plants were removed by the lawn mower due to lack of and adequate root system to provide plant anchorage. By 56 days after application, overall crabgrass health and vigor had greatly declined as fall approached. Ratings were very difficult and should be interpreted with caution as an 18% control rating was given to the non-treated control.

Dithiopyr appears to be adding a component to crabgrass control that pendimethalin does not. Given that dithiopyr as a spray is labelled for post-emergent (pre-tiller) crabgrass control, some impact on late stage crabgrass is expected. However, the enhanced and sustained stunting and necrosis of crabgrass by dithiopyr+topramezone shows these two actives to be synergistic.

As shown in FIG. 3, IE2 as well as topramezone alone, CE11, performed poorly. However, IE3 resulted in excellent control and was indistinguishable from the industry standard, Pylex (CE12). This indicates that dithiopyr and topramezone combined together synergistically to create this surprisingly high level of control as a granule.

IE3 performed extremely well for control on 6+ tiller crabgrass. Topramezone formulated on a granule either with pendimethalin or without a pre-emergence herbicide causes initial injury/control but faded.

Example 6

Experiments were conducted in Ohio in November to evaluate how different compositions perform when applied to dry foliage as compared to wet foliage. The experiments were conducted on common dandelion (*Taraxacum officinale*).

The individual plots measured 3'×3' in Ohio and were separated on each side by a 2 ft. untreated buffer strip. Products were pre-measured and hand-applied to each plot via a shaker jar and a spreader box.

Table 35 shows the formulations. IE3 and CE1 are granular products utilizing the same fertilizer base (0.8 lb. N/1000 ft$^2$), which has a N—P—K ratio of 28-0-3. Both IE3 and CE1 were applied to wet foliage (from dew) and to dry foliage. A commercially-available liquid composition (Comparative Example 13 or CE13) was used as a comparison and had no fertilizer base. CE13 was applied to dry foliage using a $CO_2$-powered boom equipped with two TeeJet 8002-VS nozzles calibrated to deliver 0.68 gal/1000 ft$^2$ at 36 psi. For the experiments in this example, IE3 and CE1 were applied at a rate of 2.85 lb/1000 ft$^2$, and CE13 was applied at a rate of 3.25 pint/A.

TABLE 35

| Example Treatment | Active Ingredient | Application (lb. a.i./A) |
|---|---|---|
| IE3 | 2,4-D | 1.5 |
| | Dicamba | 0.10 |
| | Dithiopyr | 0.25 |
| | Topramezone | 0.03 |
| CE1 | 2,4-D | 1.5 |
| | Dicamba | 0.10 |
| CE13 | 2,4-D | 0.80 |
| | MCPP | 0.21 |
| | Dicamba | 0.08 |
| Non-treated Control | | — |

These experiments were designed in the same manner discussed above for Example 1. The results were similarly collected and analyzed in the same manner discussed above for Example 1.

Weed injury (0-10) was measured between 1-5 weeks after application (see Table 36 below).

TABLE 36

| Example Treatment | 1 WAA | 2 WAA | 3 WAA | 4 WAA | 5 WAA |
|---|---|---|---|---|---|
| IE3 (wet) | 2.5 a | 5.5 a | 5.5 a | 7.3 a | 8.3 a |
| IE3 (dry) | 1.0 c | 4.5 b | 4.8 a | 5.8 b | 6.8 b |
| CE1 (wet) | 1.5 bc | 3.3 c | 3.8 b | 3.0 c | 4.5 c |
| CE1 (dry) | 0.8 cd | 1.8 d | 2.5 c | 1.5 d | 3.0 d |
| CE13 | 2.0 ab | 2.8 c | 3.8 b | 3.3 c | 4.3 cd |
| Non-treated Control | 0.0 d | 0.0 e | 0.0 d | 0.0 e | 0.0 e |
| LSD P = .05 | 0.77 | 0.91 | 0.94 | 1.04 | 1.36 |
| Standard Deviation | 0.51 | 0.6 | 0.62 | 0.69 | 0.9 |
| CV | 39.77 | 20.39 | 18.41 | 19.93 | 20.17 |

As early as one week after application, it was apparent the IE3 applied to wet foliage had better activity (weed injury) than all other treatments owing to the effects of the combination of topramezone, auxin-mimic herbicides, and dithiopyr. By two weeks, the dry foliage IE3 began to separate from both wet and dry foliage CE1 treatments. This effect held through to the 5-week weed injury rating at which time the CE1-treated weeds (wet and dry) had ceased to progress in injury symptoms whereas the IE3-treated weeds continued to decline.

During the cooling fall conditions, the effect of CE13 on dandelion slowed considerably where both IE3 treatments continued to kill the weeds. It would seem these granular-applied formulations are, at times, more efficacious than the sprayed commercial standard, CE13. The sprayed CE13 performed very similarly to CE1 (applied to wet foliage).

Weed control (%) was measured 6 and 8 weeks after application (see Table 37 below).

TABLE 37

| Example Treatment | 6 WAA | 8 WAA |
|---|---|---|
| IE3 (wet) | 93.8 a | 98.3 a |
| IE3 (dry) | 62.5 b | 93.8 a |
| CE1 (wet) | 33.8 c | 78.3 b |
| CE1 (dry) | 2.5 d | 20.0 c |
| CE13 | 10.0 cd | 22.5 c |
| Non-treated Control | 0.0 d | 0.0 d |
| LSD P = .05 | 27.15 | 18.1 |
| Standard Deviation | 18.01 | 12.01 |
| CV | 53.37 | 23.37 |

IE3 accelerates the herbicidal effects of a granular-applied composition when compared to a conventional counterpart, CE1. IE3 produced significantly more effective results than CE1 and CE13 for both wet-foliage and dry-foliage applications. IE3 provide acceptable results even when applied to dry foliage of dandelion, especially when compared to CE1. The combination of topramezone, auxin-mimic herbicides, and dithiopyr in IE3 enhances the activity of this granular composition so that it overcomes the limitations of a dry-foliage situation. IE3 improves consistency of granular-applied broadleaf herbicides especially when climatic conditions are not ideal for conventional combined herbicide-fertilizer performance.

Example 7

Experiments were conducted in Ohio in July and August to evaluate the synergy between granular forms of dithiopyr and topramezone. The experiments were conducted on smooth crabgrass (*Digitaria ischaemum*).

The treatments were applied with a shaker jar and a spreader box. Each plot was 3'×3' surrounded by a 2' buffer strip. The granular treatments applied to wet foliage either by dew or by a hand sprayer. Plot area was selected for grassy weed population with the goal of achieving the control assessment by evaluating the reduction in weed population when compared the non-treated buffer area around each plot.

Table 38 shows the formulations and application rates. All of the formulations are granular products utilizing the same fertilizer base (0.8 lb. N/1000 $ft^2$), which has a N—P—K ratio of 28-0-3, except for IE7. IE7 utilizes an inert carrier, BioDac. The application rate for these experiments was 2.86 lb./1000 $ft^2$.

TABLE 38

| Example Treatment | Active Ingredient | Application (lb. a.i./A) |
|---|---|---|
| IE3 | 2,4-D | 1.5 |
| | Dicamba | 0.10 |
| | Dithiopyr | 0.25 |
| | Topramezone | 0.03 |
| IE6 | Dithiopyr | 0.25 |
| | Topramezone | 0.03 |
| | (fertilizer base) | |
| IE7 | Dithiopyr | 0.25 |
| | Topramezone | 0.03 |
| | (BioDac base) | |
| CE4 | (fertilizer only) | — |
| CE8 | Dithiopyr | 0.25 |
| CE11 | Topramezone | 0.03 |
| Non-treated Control | | — |

These experiments were designed in the same manner discussed above for Example 1. The results were similarly collected and analyzed in the same manner discussed above for Example 1.

These experiments were conducted for post-emergent control of late-stage crabgrass during late-summer. The crabgrass growth stages at each application were as follows: Run 1 was applied July 19 (2-3 tiller and quite visible above turf canopy); Run 2 was applied July 24 (3-5 tiller); and Run 3 was applied August 2 (5-7 tiller and just beginning to produce seedheads). These were repeated three times to verify the effects observed were consistent and repeatable. The trials were repeated in quick succession due to rapid nature in which crabgrass grows and matures during the summer growing conditions.

Run 1

Crabgrass injury (0-10) was evaluated 3, 7, and 12 days after application (see Table 39 below).

TABLE 39

| Example Treatment | 3 DA-A | 7 DA-A | 12 DA-A |
|---|---|---|---|
| IE3 | 3.3 a | 4.8 b | 5.8 a |
| IE6 | 3.5 a | 5.0 ab | 6.3 a |
| IE7 | 1.8 b | 3.3 c | 3.3 bc |
| CE8 | 1.8 b | 1.5 d | 3.0 c |
| CE11 | 4.0 a | 5.5 a | 4.3 b |
| CE4 | 1.5 b | 0.0 e | 0.0 d |
| Non-treated Control | 1.0 b | 0.0 e | 0.0 d |
| LSD P = .05 | 1 | 0.68 | 1.08 |
| Standard Obviation | 0.67 | 0.46 | 0.72 |
| CV | 28.11 | 16.05 | 22.52 |

Additionally, visual crabgrass control (0-100) was evaluated 21, 28, 35, and 42 days after application (see Table 40 below).

TABLE 40

| Example Treatment | 21 DA-A | 28 DA-A | 35 DA-A | 42 DA-A |
|---|---|---|---|---|
| IE3 | 80.0 ab | 79.8 ab | 83.8 a | 85.8 ab |
| IE6 | 96.5 a | 96.0 a | 96.8 a | 97.0 a |
| IE7 | 17.5 c | 15.0 d | 42.5 b | 41.3 c |
| CE4 | 2.5 cd | 0.0 d | 0.0 c | 0.0 d |
| CE8 | 70.0 b | 52.5 c | 75.0 a | 61.3 bc |
| CE11 | 63.8 b | 62.5 bc | 82.5 a | 83.8 ab |
| Non-treated Control | 0.0 d | 0.0 d | 0.0 c | 0.0 d |
| LSD P = .05 | 17.26 | 20.96 | 23.08 | 27.44 |
| Standard Obviation | 11.62 | 14.11 | 15.53 | 18.47 |
| CV | 24.62 | 32.3 | 28.58 | 35.03 |

Run 2

Crabgrass injury (0-10) was evaluated 7 and 14 days after application (see Table 41 below).

TABLE 41

| Example Treatment | 7 DA-A | 14 DA-A |
|---|---|---|
| IE3 | 3.0 b | 4.0 bc |
| IE6 | 3.0 b | 5.3 a |
| IE7 | 1.8 c | 3.3 c |
| CE4 | 0.0 d | 0.0 e |
| CE8 | 0.3 d | 1.3 d |
| CE11 | 4.0 a | 4.5 ab |
| Non-treated Control | 0.0 d | 0.0 e |
| LSD P = .05 | 0.39 | 1.01 |
| Standard Deviation | 0.26 | 0.68 |
| CV | 15.15 | 26.02 |

Additionally, visual crabgrass control (0-100) was evaluated 22, 28, and 35 days after application (see Table 42 below).

TABLE 42

| Example Treatment | 22 DA-A | 28 DA-A | 35 DA-A |
|---|---|---|---|
| IE3 | 80.0 a | 85.0 ab | 85.8 a |
| IE6 | 86.3 a | 90.0 a | 93.8 a |
| IE7 | 2.5 c | 25.0 cd | 23.8 bc |
| CE4 | 0.0 c | 0.0 d | 0.0 c |
| CE8 | 40.0 b | 55.0 be | 46.3 b |
| CE11 | 42.5 b | 31.3 c | 43.8 b |
| Non-treated Control | 0.0 c | 0.0 d | 0.0 c |
| LSD P = .05 | 20.64 | 31.22 | 35.74 |
| Standard Deviation | 12.89 | 21.02 | 24.06 |
| CV | 38.7 | 51.4 | 57.43 |

Figure 5:
FIGS. 5-7 depict photographs of turf three weeks after treatment with various comparative compositions.
Figure 6:
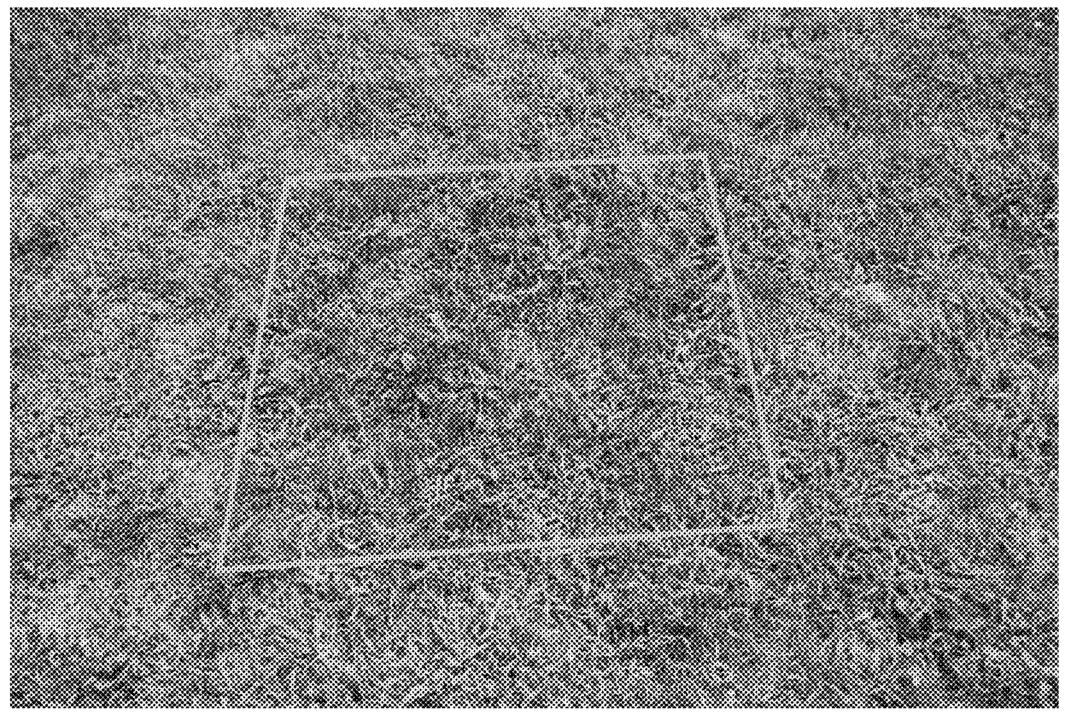
Figure 7:
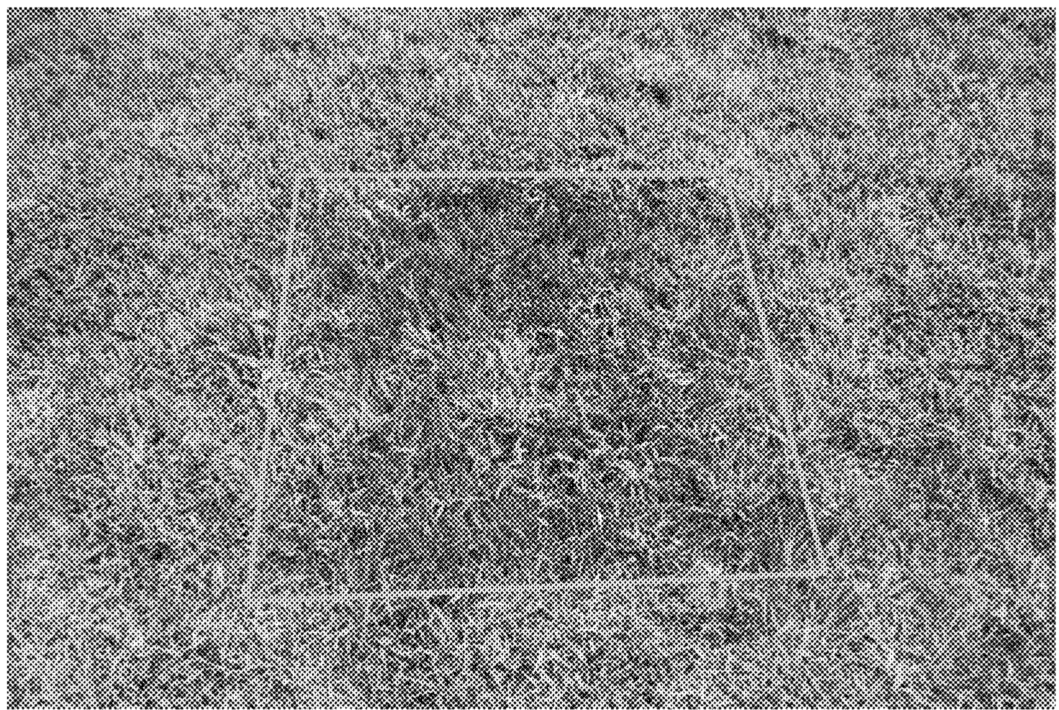
Figure 8:
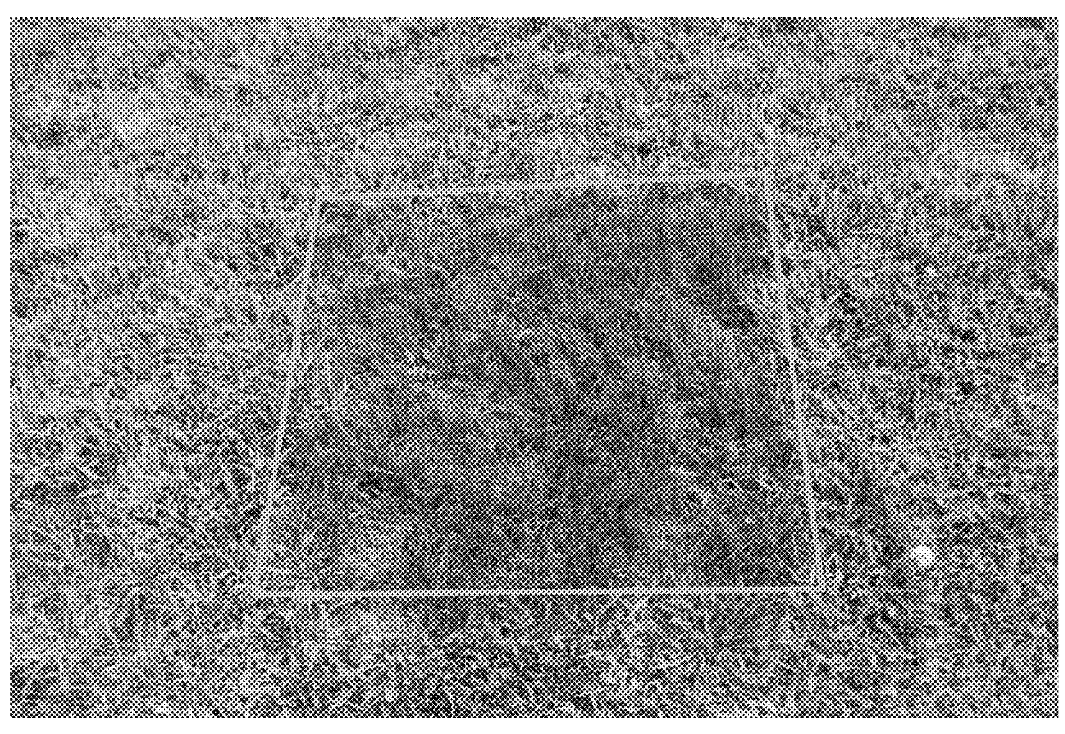
FIGS. 8 and 9 depict photographs of turf three weeks after treatment with compositions according to various embodiments.
Figure 9:
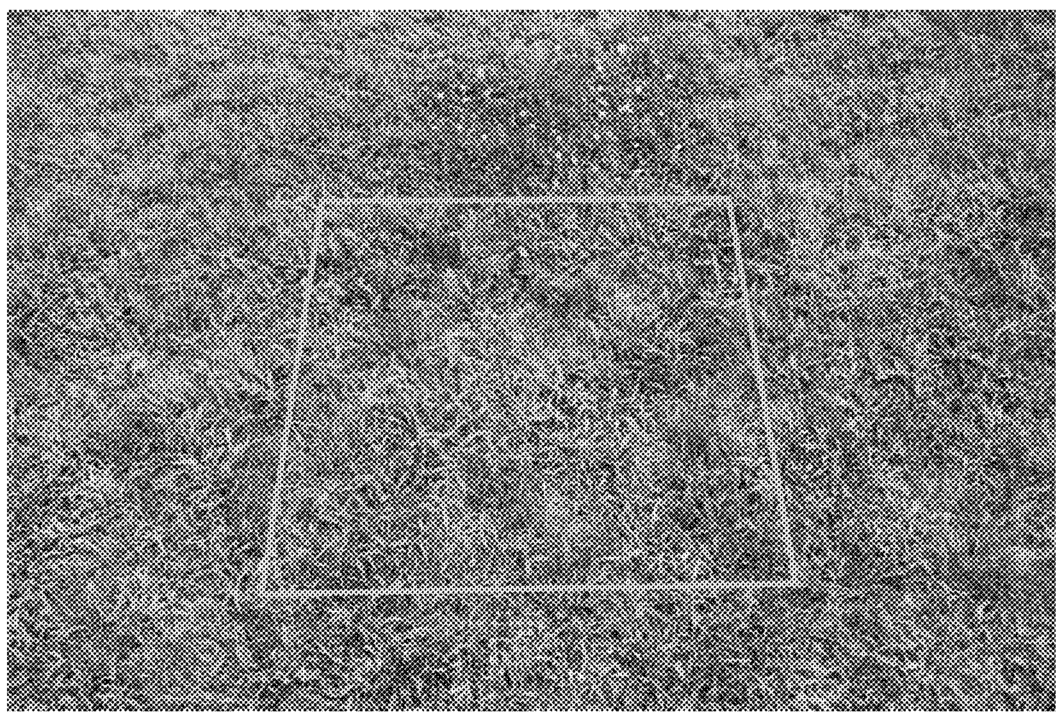

FIGS. 5-7 depict photographs of turf three weeks after treatment with CE4, CE8, and CE11, respectively. FIGS. 8 and 9 depict photographs of turf three weeks after treatment with IE6 and IE7, respectively.

Run 3

Crabgrass injury (0-10) was evaluated 7, 14, and 21 days after application (see Table 43 below).

TABLE 43

| Example Treatment | 7 DA-A | 14 DA-A | 21 DA-A |
|---|---|---|---|
| IE3 | 2.3 b | 3.0 b | 4.5 ab |
| IE6 | 2.3 b | 3.3 b | 4.8 a |
| IE7 | 0.8 c | 1.0 c | 2.8 d |
| CE4 | 0.0 d | 0.0 c | 0.0 e |
| CE8 | 0.0 d | 0.8 c | 3.8 bc |
| CE11 | 4.3 a | 4.5 a | 3.5 cd |
| Non-treated Control | 0.0 d | 0.3 c | 0.0 e |

TABLE 43-continued

| Example Treatment | 7 DA-A | 14 DA-A | 21 DA-A |
|---|---|---|---|
| LSD P = .05 | 0.46 | 1.04 | 0.89 |
| Standard Deviation | 0.31 | 0.7 | 0.6 |
| CV | 22.74 | 38.51 | 21.73 |

Additionally, visual crabgrass control (0-100) was evaluated 28 days after application (see Table 44 below).

TABLE 44

| Example Treatment | 28 DA-A |
|---|---|
| IE3 | 66.3 b |
| IE6 | 95.8 a |
| IE7 | 70.0 ab |
| CE4 | 0.0 c |
| CE8 | 75.0 ab |
| CE11 | 23.8 c |
| Non-treated Control | 0.0 c |
| LSD P = .05 | 29.14 |
| Standard Deviation | 19.62 |
| CV | 41.52 |

Results

Early results from these three trials showed that crabgrass injury was significantly greater with topramezone alone (CE11) when compared to dithiopyr alone (CE8) (see Tables 39-44). Topramezone caused a very visible leaf whitening and so the initial injury on the crabgrass was always noticeably greater than with dithiopyr, which appeared to merely stunt the growth of the crabgrass. Topramezone whitening effects were somewhat muted when topramezone was combined with auxinic herbicides (i.e., 2,4-D and dicamba in IE3). The combination of dithiopyr and topramezone on the inert carrier (i.e., BioDac (IE7)) showed very little crabgrass injury owing to the higher density, rounded particles of the BioDac carrier, which had poor adherence to the crabgrass leaves and thus poor transfer of the active ingredients from particle to crabgrass leaf as compared to the fertilizer carrier. In addition to these physical characteristics, much of the fertilizer particle is readily dissolvable upon contact with water thereby releasing its active ingredients. BioDac does not readily dissolve upon contact with water. The treatment that included the fertilizer particle alone caused no injury to crabgrass.

The visual crabgrass control ratings compared the density of crabgrass within the plot to the density of crabgrass in the adjacent 2-foot non-treated buffer strips to determine a visually estimated percent control. In all three trials, the combination of dithiopyr and topramezone on the fertilizer carrier (IE6) tended to provide the best, most consistent crabgrass control of any treatment. As seen in the injury ratings, the addition of auxinic herbicides to this combination consistently caused a reduction in control though the difference was rarely statistically significant. Dithiopyr and topramezone, each on the fertilizer carrier, also provided varying degrees of visual crabgrass control but not to the level of that provided by the combination of dithiopyr and topramezone (all utilizing the fertilizer base). When these active ingredients were mounted onto the BioDac carrier there was a significant loss of crabgrass control compared to the same actives mounted on the fertilizer base. As described above, this was likely due to the physical properties of the two carriers and the difference in their ability to adhere to the narrow, acicular leaves of the crabgrass.

The crabgrass control aspects of these formulations were analyzed using visually estimated crabgrass density ratings (See FIG. 4, Run 1) and comparing initial density to the density at subsequent weekly ratings. To determine percent of control, these density estimations were then subjected to the following Henderson-Tilton equation:

$$\%\text{ of Control} = 1 - \frac{(WD_C \text{ before treatment} \times WD_T \text{ after treatment})}{(WD_C \text{ after treatment} \times WD_T \text{ before treatment})} \times 100$$

where $WD_C$ is the percent Weed Density (Crabgrass) in the control plot and $WD_T$ is the percent Weed Density (Crabgrass) in the treated plot. This equation adjusts the control results by accounting for pest populations that are variable or that can shift during the trial. In the case of crabgrass that continues to grow dimensionally over the course of a trial, this equation was appropriate.

The percent of control value for dithiopyr alone and topramezone alone was subjected to the Colby equation to generate Expected Control (E) to help determine synergism between the two herbicides. The Colby equation is:

$$E = x + y - \frac{x \times y}{100}$$

where x is the effect of “herbicide A” applied alone (percent of control), y is the effect of “herbicide B” applied alone (percent of control), and E is the expected control of the combination of “herbicide A” and “herbicide B.” Expected Control is then compared to the field-generated percent of control provided by the two herbicides applied in combination. If the Expected Control (E) is less than that measured in the field, then there is synergism according to the Colby test. Tables 45-47 show the percent control and expected control (for IE6) of runs 1-3, respectively.

TABLE 45

| | % Control (Expected Control) | | | |
|---|---|---|---|---|
| Example Treatment | 3 WAT | 4 WAT | 5 WAT | 6 WAT |
| IE3 | 84.1 ab | 83.3 a | 84.0 ab | 84.8 ab |
| IE6 | 97.5 a | 96.9 a | 93.4 a | 95.7 a |
| | (93.4) | (82.5) | (89.8) | (91.1) |
| IE7 | 62.5 d | 53.0 b | 59.3 c | 66.3 c |
| CE4 | 0.0 e | 0.0 c | 0.0 d | 0.0 d |
| CE8 | 79.1 bc | 58.0 b | 69.0 bc | 68.4 c |
| CE11 | 68.4 cd | 58.3b | 67.2 bc | 71.7 bc |
| Non-treated Control | 0.0 e | 0.0 c | 0.0 d | 0.0 d |
| LSD P = .05 | 13.9 | 18.55 | 20.4 | 14.77 |
| Stand Dev. | 9.36 | 12.49 | 13.73 | 9.94 |
| CV | 16.72 | 25.02 | 25.78 | 17.99 |

TABLE 46

| | % Control (Expected Control) | | | |
|---|---|---|---|---|
| Example Treatment | 3 WAT | 4 WAT | 5 WAT | 6 WAT |
| IE3 | 82.1 a | 84.8 a | 82.3 a | 82.0 a |
| IE6 | 87.5 a | 90.7 a | 90.5 a | 88.0 a |
| | (69.7) | (75.1) | (69.5) | (25.3) |
| IE7 | 39.3 b | 40.1 b | 25.4 bc | 28.7 abc |
| CE4 | −19.3 d | −23.5 d | −41.2 d | −46.3 d |

TABLE 46-continued

| Example Treatment | % Control (Expected Control) | | | |
|---|---|---|---|---|
| | 3 WAT | 4 WAT | 5 WAT | 6 WAT |
| CE8 | 66.1 ab | 65.6 ab | 58.1 ab | 41.9 ab |
| CE11 | 10.6 c | 27.5 bc | 27.1 bc | −28.6 cd |
| Non-treated Control | 0.0 cd | 0.0 cd | 0.0 cd | 0.0 bcd |
| LSD P = .05 | 27.38 | 38.31 | 42.69 | 65.57 |
| Stand Dev. | 18.43 | 25.79 | 28.74 | 44.14 |
| CV | 48.43 | 63.29 | 83.07 | 186.56 |

TABLE 47

| Example Treatment | % Control (Expected Control) | | |
|---|---|---|---|
| | 2WAT | 4 WAT | 5 WAT |
| IE3 | 6.2 a | 62.1 ab | 73.6 b |
| IE6 | 13.7 a | 90.8 a | 94.8 a |
| | (41.8) | (67.9) | (90.8) |
| IE7 | −18.3 a | 52.6 b | 69.3 bc |
| CE4 | 0.0 a | 0.0 c | 0.0 d |
| CE8 | 30.7 a | 46.8 b | 80.1 ab |
| CE11 | 16.0 a | 39.6 b | 53.7 c |
| Non-treated Control | 0.0 a | 0.0 c | 0.0 d |
| LSD P = .05 | 31.79 | 30.3 | 17.63 |
| Stand Dev. | 21.4 | 20.4 | 11.86 |
| CV | 310.26 | 48.91 | 22.36 |

It is apparent the incidence of synergism between dithiopyr and topramezone is consistent and highly repeatable.

Accordingly, the treatments that included the combination of dithiopyr and topramezone on a fertilizer granule provided acceptable post-emergent control of crabgrass (+80%) at most application timings. Additionally, the grassy weed herbicides dithiopyr and topramezone acted synergistically on three stages of late-season crabgrass. Another notable observation is that, whenever 2,4-D and dicamba are included with the combination of dithiopyr and topramezone (IE3), there is a consistent loss of crabgrass efficacy. Mostly, this reduction in crabgrass control is insignificant but it does indicate there is possible antagonism between auxinic herbicides and the combination of dithiopyr and topramezone. It should also be noted the appreciable loss of efficacy when the combination of dithiopyr and topramezone is mounted on BioDac (IE7) as compared to when it is mounted on the fertilizer particle. As expected, the fertilizer carrier alone (CE4) did nothing to control crabgrass and tended to stimulate crabgrass growth compared to the non-treated control.

Example 8

Experiments were conducted in Ohio in the fall (post-bloom) and spring (peak bloom) to evaluate the synergy between two auxinic herbicides—2,4-D and dicamba—and topramezone. The experiments were conducted on common dandelion (*Taraxacum officinale*).

The treatments were applied with a shaker jar and a spreader box. Each plot was 3'×3' surrounded by a 2' buffer strip. The granular treatments applied to wet foliage either by dew or by a hand sprayer. Plot area was selected for broadleaf weed population with the goal of achieving the control assessment by evaluating the reduction in weed population when compared the non-treated buffer area around each plot.

Table 48 shows the formulations and application rates. All of the formulations are granular products utilizing the same fertilizer base (0.8 lb. N/1000 ft$^2$), which has a N—P—K ratio of 28-0-3, except for IE8. IE8 utilizes an inert carrier, BioDac. The application rate for these experiments was 2.86 lb./1000 ft$^2$.

TABLE 48

| Example Treatment | Active Ingredient (a.i.) | Application (lb. a.i./A) |
|---|---|---|
| IE1 | 2,4D | 1.5 |
| | Dicamba | 0.10 |
| | Topramezone | 0.03 |
| | (fertilizer base) | |
| IE3 | 2,4D | 1.5 |
| | Dicamba | 0.10 |
| | Dithiopyr | 0.25 |
| | Topramezone | 0.03 |
| IE8 | 2,4D | 1.5 |
| | Dicamba | 0.10 |
| | Topramezone | 0.03 |
| | (BioDac base) | |
| CE1 | 2,4D | 1.5 |
| | Dicamba | 0.10 |
| CE4 | (fertilizer only) | — |
| CE11 | Topramezone | 0.03 |
| Non-treated Control | | — |

These experiments were designed in the same manner discussed above for Example 1. The results were similarly collected and analyzed in the same manner discussed above for Example 1.

Post-Emergence Control of Dandelion During the Fall

Dandelion injury (0-10) was evaluated 5, 8, 14, 27, and 35 days after treatment (see Table 49 below).

TABLE 49

| Example Treatment | 5 DAT | 8 DAT | 14 DAT | 27 DAT | 35 DAT |
|---|---|---|---|---|---|
| IE1 | 2.3 ab | 3.3 ab | 4.0 a | 6.3 b | 8.0 a |
| IE3 | 2.3 ab | 3.5 a | 4.5 a | 8.0 a | 8.0 a |
| IE8 | 0.8 cd | 1.3 c | 1.5 b | 2.3 c | 3.5 b |
| CE1 | 1.5 bc | 2.5 b | 2.0 b | 3.0 c | 5.5 b |
| CE4 | 0.0 d | 0.0 d | 0.0 c | 0.0 d | 0.0 c |
| CE11 | 3.0 a | 3.3 ab | 3.5 a | 2.3 c | 0.8 c |
| Non-treated Control | 0.0 d | 0.0 d | 0.0 c | 0.0 d | 0.0 c |
| LSD P = .05 | 0.86 | 0.83 | 1.24 | 1.18 | 2.06 |
| Standard Deviation | 0.58 | 0.56 | 0.84 | 0.79 | 1.39 |
| CV | 41.45 | 28.32 | 37.74 | 25.48 | 37.71 |

Dandelion injury symptoms began showing with most of the treatments at the 5 and 8 day ratings, but it was not until the 27 day rating that separation among the treatments began to show. Treatments that included 2,4-D, dicamba, and topramezone on the fertilizer carrier (IE1 and IE3) exhibited significantly greater weed injury than all other treatments. Topramezone alone and the combination of 2,4-D and dicamba alone had lesser effects on dandelion, thereby suggesting enhanced effects when these herbicides are combined. Interestingly, when these three herbicides were applied using BioDac, the resulting effects were very subdued compared to this combination on the fertilizer particle. These trends continued at the 35 day rating.

Additionally, visual dandelion control (%) was evaluated 8 weeks after treatment (see Table 50 below).

TABLE 50

| Example Treatment | 8 WAT |
|---|---|
| IE1 | 99.8 a |
| IE3 | 99.5 a |
| IE8 | 47.5 b |
| CE1 | 95.8 a |
| CE4 | 0.0 c |
| CE11 | 2.5 c |
| Non-treated Control | 0.0 c |
| LSD P = .05 | 18.9 |
| Standard Deviation | 12.72 |
| CV | 25.81 |

At 8 weeks, the visual dandelion control results revealed nearly complete control by all of the treatments that included 2,4-D and dicamba on the fertilizer carrier. It appeared that the addition of topramezone is necessary to provide early results, but that the combination of 2,4-D and dicamba alone eventually catches up to provide similar effects. The combination of 2,4-D, dicamba, and topramezone on BioDac (IE8) gave very poor control as did topramezone alone (CE11).

This trial also showed that the addition of dithiopyr to the herbicide mix (IE3) did not alter the synergistic effect of the combination of topramezone with 2,4-D and dicamba when compared to the treatment without (IE1).

Post-Emergence Control of Dandelion During the Spring

Dandelion injury (0-10) was evaluated 5, 8, 14, 27, and 35 days after treatment (see Table 51 below).

TABLE 51

| Example Treatment | 3 DA-A | 7 DA-A | 21 DA-A | 28 DA-A |
|---|---|---|---|---|
| IE1 | 2.3 a | 3.0 a | 4.5 a | 7.3 a |
| IE3 | 2.0 a | 2.5 b | 5.3 a | 7.8 a |
| IE8 | 0.3 b | 2.0 c | 2.0 b | 4.3 b |
| CE1 | 2.0 a | 2.8 ab | 4.3 a | 6.8 a |
| CE4 | 0.0 b | 0.0 e | 0.0 c | 0.3 c |
| CE11 | 0.0 b | 1.0 d | 3.0 b | 1.0 c |
| Non-treated Control | 0.0 b | 0.0 e | 0.0 c | 0.0 c |
| LSD P = .05 | 0.58 | 0.45 | 1.02 | 1.38 |
| Standard Deviation | 0.39 | 0.3 | 0.69 | 0.93 |
| CV | 42 | 18.8 | 25.32 | 24 |

This trial showed quite similar results as were obtained in the fall trial (Tables 49 and 50). One notable difference is that, in this trial, the formulations including 2,4-D, dicamba, and topramezone on the fertilizer carrier (IE1 and IE3) did not cause significantly more injury than the combination of 2,4-D and dicamba on the fertilizer carrier (CE1). The addition of topramezone did not enhance the herbicidal effects as seen in the fall trial. This could not be explained. The formulation using the BioDac carrier (IE8) again provided significantly inferior results compared to the counterpart treatment that included the fertilizer particle as the carrier (IE1). Topramezone alone (CE11) caused slight and brief foliar discoloration but mostly had very little activity on spring dandelion.

Additionally, visual dandelion control (%) was evaluated 8 weeks after treatment (see Table 52 below).

TABLE 52

| Example Treatment | 28 DA-A | 56 DA-A |
|---|---|---|
| IE1 | 88.8 ab | 87.5 a |
| IE3 | 90.38 a | 88.8 a |
| IE8 | 48.8 c | 12.5 b |
| CE1 | 81.3 b | 83.8 a |
| CE4 | 0.0 d | 0.0 b |
| CE11 | 0.0 d | 0.0 b |
| Non-treated Control | 0.0 d | 0.0 b |
| LSD = .05 | 9.23 | 14.49 |
| Standard Deviation | 6.22 | 9.75 |
| CV | 14.06 | 25.06 |

Visual dandelion control rated at 4 and 8 weeks after treatment revealed that formulations including 2,4-D and dicamba on the fertilizer carrier (IE1, IE3, and CE1) provided statistically similar dandelion control. However, it should be noted that of those treatments, only those that included topramezone (IE1 and IE3) provided commercially acceptable control of 85% or greater. This same set of active ingredients mounted on the BioDac carrier (IE8) again provided inferior dandelion control.

Results

The dandelion control aspects of these formulations were further analyzed using visually estimated dandelion density ratings, and the percent of control was determined in the same manner discussed in Example 7. The Henderson-Tilton data transformation adjusts the control results by accounting for pest populations that are variable or that can shift during the trial. As also discussed in Example 7, Expected Control was determined for topramezone alone and for the combination of 2,4-D and dicamba, which was then compared to the field-generated percent of control provided by the 2,4-D, dicamba, and topramezone applied in combination. If the Expected Control (E) is less than that measured in the field, then there is synergism according to the Colby test. Tables 53 and 54 show the percent control and expected control (for IE1) of the fall trial and the spring trial, respectively.

TABLE 53

| Example Treatment | 4 WAT | 5 WAT | 6 WAT | 8 WAT | 30 WAT |
|---|---|---|---|---|---|
| IE1 | 75.4 a (70.8) | 84.6 a (80.9) | 94.8 a (91.9) | 98.9 a (93.3) | 84.6 a (83.4) |
| IE3 | 72.4 a | 80.9 a | 95.5 a | 49.1 a | 79.5 a |
| IE8 | 20.8 c | 20.4 b | 61.9 b | 0 b | 27.2 b |
| CE1 | 59.2 ab | 74.6 a | 86.8 a | 90.2 a | 72.2 a |
| CE4 | 0 c | 0 b | 0 d | d | 0 c |
| CE11 | 28.5 bc | 24.8 b | 39 c | 32.1 bc | 40.4 b |

TABLE 54

| Example Treatment | 4 WAT | 5 WAT | 6 WAT | 8 WAT |
|---|---|---|---|---|
| IE1 | 71.8 a (19.5) | 88.1 a (73.4) | 84.9 a (76.6) | 88.7 a (73.9) |
| IE3 | 76.6 a | 84.4 a | 82.3 a | 85 a |
| IE8 | 14.4 abc | 24.2 b | 9.1 b | 9.2 b |
| CE1 | 38.4 ab | 70.0 a | 80.7 a | 76.7 a |
| CE4 | 0 bc | 0.0 c | 0 b | 0 b |
| CE11 | −30.7 c | 11.2 bc | −21.1 b | −12.1 b |

It is apparent the incidence of synergism between topramezone and the combination of 2,4-D and dicamba is consistent and highly repeatable on common dandelion whether tested in the fall or the spring. Thus, these trials successfully documented the synergistic post-emergence herbicidal effects of 2,4-D, dicamba, and topramezone on common dandelion. Further, formulations that included 2,4-D, dicamba, and topramezone on a fertilizer carrier provided exceptional post-emergence dandelion control (+85%) at both application timings. The addition of dithiopyr to the combination of 2,4-D, dicamba, and topramezone did not appear to impact the broadleaf weed efficacy.

The results showed an appreciable loss of efficacy when 2,4-D, dicamba, and topramezone are mounted on BioDac as compared to when it is mounted on the fertilizer particle. The combination of particle shape, density and chemical make-up gives the fertilizer carrier a distinct and measureable advantage over BioDac. As expected, the nitrogen-based fertilizer carrier alone did nothing to control dandelion.

As used herein, all percentages (%) are percent by weight of the total composition, also expressed as weight/weight %, % (w/w), w/w, w/w % or simply %, unless otherwise indicated.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A granular herbicide comprising:

a granular carrier coated with an herbicide composition for controlling crabgrass, the herbicide composition consisting essentially of:

topramezone;

dithiopyr; and optionally, a viscosity modifier;

wherein the granular carrier comprises a fertilizer granule;

wherein a ratio of dithiopyr to topramezone is in a range of 8:0.9 to 9:1.1; and wherein the granular herbicide effects at least 80% control of crabgrass at three or more weeks after treatment.

2. The granular herbicide of claim 1, wherein topramezone is present in a range of about 0.02 wt % to about 0.0275 wt % and dithiopyr is present in a range of about 0.15 wt % to 0.25 wt %.

3. The granular herbicide of claim 1, wherein topramezone is present in a range of about 0.023 wt % to about 0.025 wt % and dithiopyr is present in a range of about 0.18 wt % to 0.22 wt %.

4. The granular herbicide of claim 1, comprising a viscosity modifier.

5. The granular herbicide of claim 4, wherein the viscosity modifier is dipropylene glycol.

6. The granular herbicide of claim 1, wherein the fertilizer granule comprises a mixture of a urea-containing fertilizer and rice hulls.

7. A method of controlling a weed plant, the method comprising applying the herbicide composition of claim 1 on the weed plant.

8. The method of claim 7, further comprising killing the weed plant.

9. The method of claim 7, wherein applying comprises applying topramezone at a rate of 0.03 lb./A, 2,4-D at a rate of 1.5 lb./A, dicamba at a rate of 0.1 lb./A, and dithiopyr at a rate of 0.25 lb./A.

10. A granular herbicide comprising:

a granular carrier coated with an herbicide composition for controlling broadleaf vegetation, the herbicide composition consisting of:

topramezone;

2,4-dichlorophenoxyacetic acid (2,4-D), and 3,6-dichloro-2-methoxybenzoic acid (dicamba); and dithiopyr;

wherein a ratio of 2,4-D to dicamba to dithiopyr to topramezone is in a range of 48:3:8:0.9 to 52:4:9:1.1;

wherein the granular carrier comprises a fertilizer granule.

11. A method of making the herbicide composition of claim 10, the method comprising coating the granular carrier with the mixture of topramezone, 2,4-D, dicamba, and dithiopyr.

12. A granular herbicide consisting essentially of:

a granular carrier coated with an herbicide composition, the herbicide composition consisting of:

topramezone; and dithiopyr;

wherein the granular carrier comprises a fertilizer granule, the fertilizer granule comprising a mixture of a urea-containing fertilizer and rice hulls;

wherein a ratio of dithiopyr to topramezone is in a range of 8:0.9 to 9:1.1; and wherein the granular herbicide effects at least 80% control of crabgrass at three or more weeks after treatment.

* * * * *